Sept. 2, 1952 T. A. HANSEN 2,609,451
MULTIPLEX TELEGRAPH SYSTEM UTILIZING ELECTRONIC DISTRIBUTORS
Filed Oct. 15, 1948 23 Sheets-Sheet 1

INVENTOR
THEODORE A. HANSEN
BY Emery Robinson
ATTORNEY

INVENTOR
THEODORE A. HANSEN
BY Emery Robinson
ATTORNEY

TO LOCAL TRANSMITTER

INVENTOR
THEODORE A. HANSEN
BY Emery Robinson
ATTORNEY

INVENTOR
THEODORE A. HANSEN

Sept. 2, 1952 T. A. HANSEN 2,609,451
MULTIPLEX TELEGRAPH SYSTEM UTILIZING ELECTRONIC DISTRIBUTORS
Filed Oct. 15, 1948 23 Sheets-Sheet 22

INVENTOR
THEODORE A. HANSEN
BY Emery Robinson
ATTORNEY

Sept. 2, 1952     T. A. HANSEN     2,609,451

MULTIPLEX TELEGRAPH SYSTEM UTILIZING ELECTRONIC DISTRIBUTORS

Filed Oct. 15, 1948     23 Sheets-Sheet 23

INVENTOR
THEODORE A. HANSEN
BY Emery Robinson
ATTORNEY

Patented Sept. 2, 1952

2,609,451

UNITED STATES PATENT OFFICE 2,609,451

MULTIPLEX TELEGRAPH SYSTEM UTILIZING ELECTRONIC DISTRIBUTORS

Theodore A. Hansen, Park Ridge, Ill., assignor to Teletype Corporation, Chicago, Ill., a corporation of Delaware Application October 15, 1948, Serial No. 54,772

11 Claims. (Cl. 178—50)

The present invention relates to telegraph systems and more particularly to time division multiplex telegraph systems utilizing electronic distributors.

Multiplex telegraph systems are well known in operation and use but are limited to a great extent in the maximum speed attainable and in the number of channels which may transmit over a single circuit. Further, the prior multiplex systems utilized apparatus of a mechanical nature and therefore needed a fairly large amount of maintenance in order to insure that the parts were adjusted properly and functioning correctly.

Accordingly, a primary object of the present invention is to provide a multiplex telegraph system utilizing electronic elements and components thereof.

A second object of the invention is to permit higher speeds of operation and increased number of channels of transmission, and greater stability.

A still further object of the present invention is to provide a continuity circuit in order to be able to ascertain that the communication channel is open.

Prior mechanical systems lacked a degree of flexibility in circuit facilities which is provided by an electronic system. Power requirements are also minimized, due to elimination of synchronous motors and heavy precision motor drive power equipment.

A still further object of the invention is to provide facilities for operation at more than one start-stop channel speed.

Yet another object of the invention is to provide a high degree of system stability with the use of precision quartz crystal controlled distributors.

Another object of the invention is to provide simple switching facilities to allow transmission over a signaling channel from two, three and four signal sources, and to divide the total available transmission time equally between only the number of channels in use.

A further object of the invention is to provide for rapidly and easily operated phasing control.

The system generally, at the transmitting station, comprises a crystal controlled electron coupled oscillator and frequency divider for supplying operating impulses to an impulse distributor and a channel distributor which conjointly operate to control a plurality of matrix tubes. The distributors are both of the electronic variety. The matrix tubes are operated conjointly by the impulse distributor, the channel distributor and the received signal impulses, which may originate from a standard tape transmitter, a start-stop to multiplex converter or any other suitable known signal impulse originating apparatus. The output from the matrix tubes is passed through appropriate amplifiers and is impressed on a signaling channel for transmission to a distant station. The transmitting unit is also provided with a portion of a continuity circuit which when taken with a portion at a local receiving device acts as an alarm system to advise when the signaling channel has failed. A frequency meter is also provided at the transmitting station in order that the output frequency from the frequency divider may be read directly.

The receiving station comprises a crystal controlled electron coupled oscillator and frequency divider similar to that of the transmitting station for deriving impulses at the proper frequency for driving an impulse distributor and a channel distributor, also similar to those at the transmitting station. Corrector apparatus is provided at the receiver, however, in order that the crystal oscillator may be operated at a frequency to maintain correct phase relationship between the local distributor and the received signals. The corrector comprises means for comparing the derived frequency with the incoming signals and operating a reactance tube which serves to control the frequency of vibration of the crystal in order to insure a proper operating frequency. A plurality of matrix tubes are under the control of the impulse distributor, the channel distributor and the received code signals from the distant transmitting station, which serve to receive the signal impulses in their proper order and allow them to be utilized in a multiplex to start-stop converter or some other appropriate apparatus such as a plural magnet recorder or perforator.

A full understanding of the apparatus and its system operation may be had by reference to the following detailed description, when read in conjunction with the drawings of the system which are as follows:

Figs. 1 and 2 illustrate the transmitter frequency drive and appropriate amplifiers and squarers for supplying a frequency output in the desired range;

Figs. 3 to 8, inclusive, illustrate the circuit arrangement for the transmitting multiplex distributor;

Figure 12:
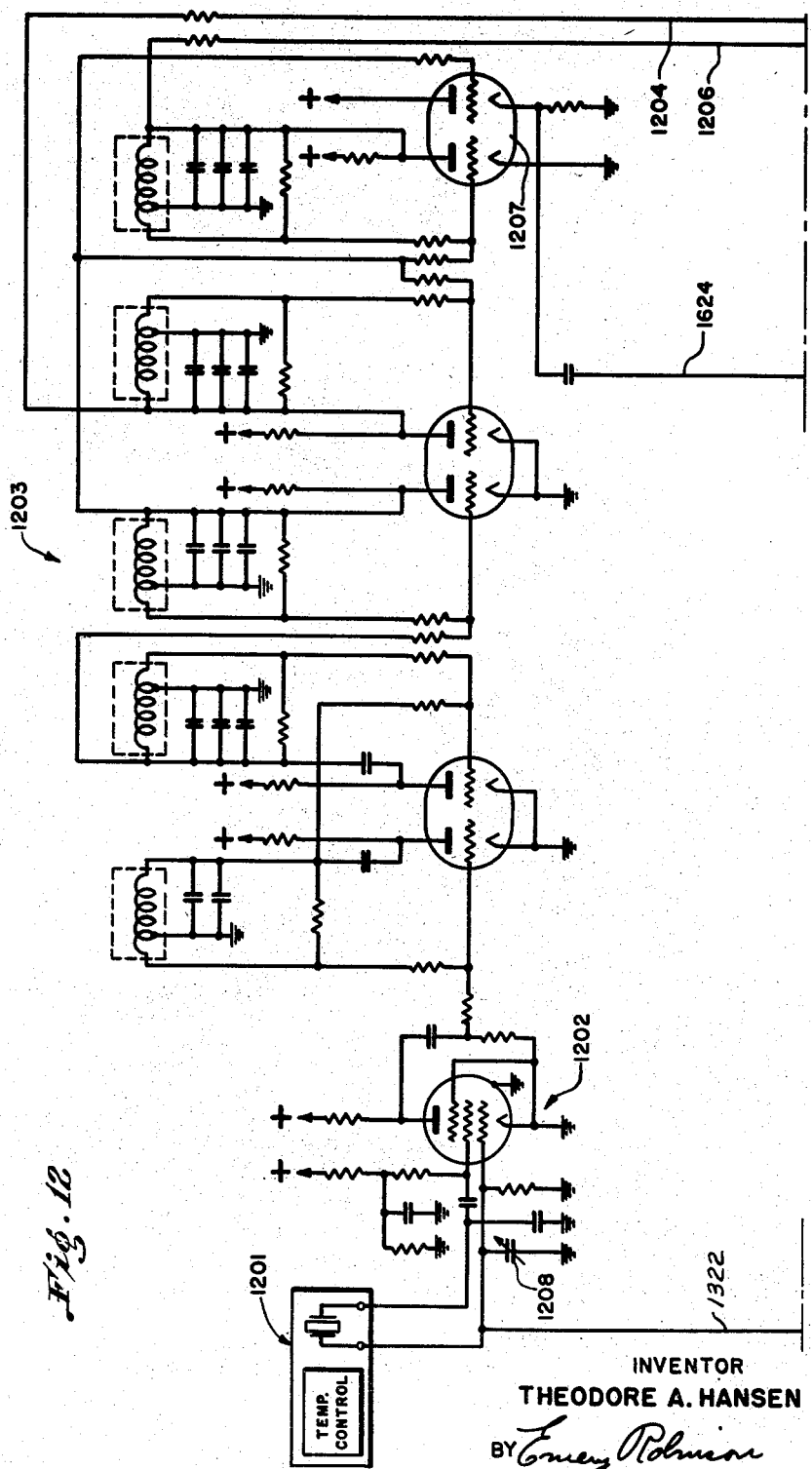
Figure 13:
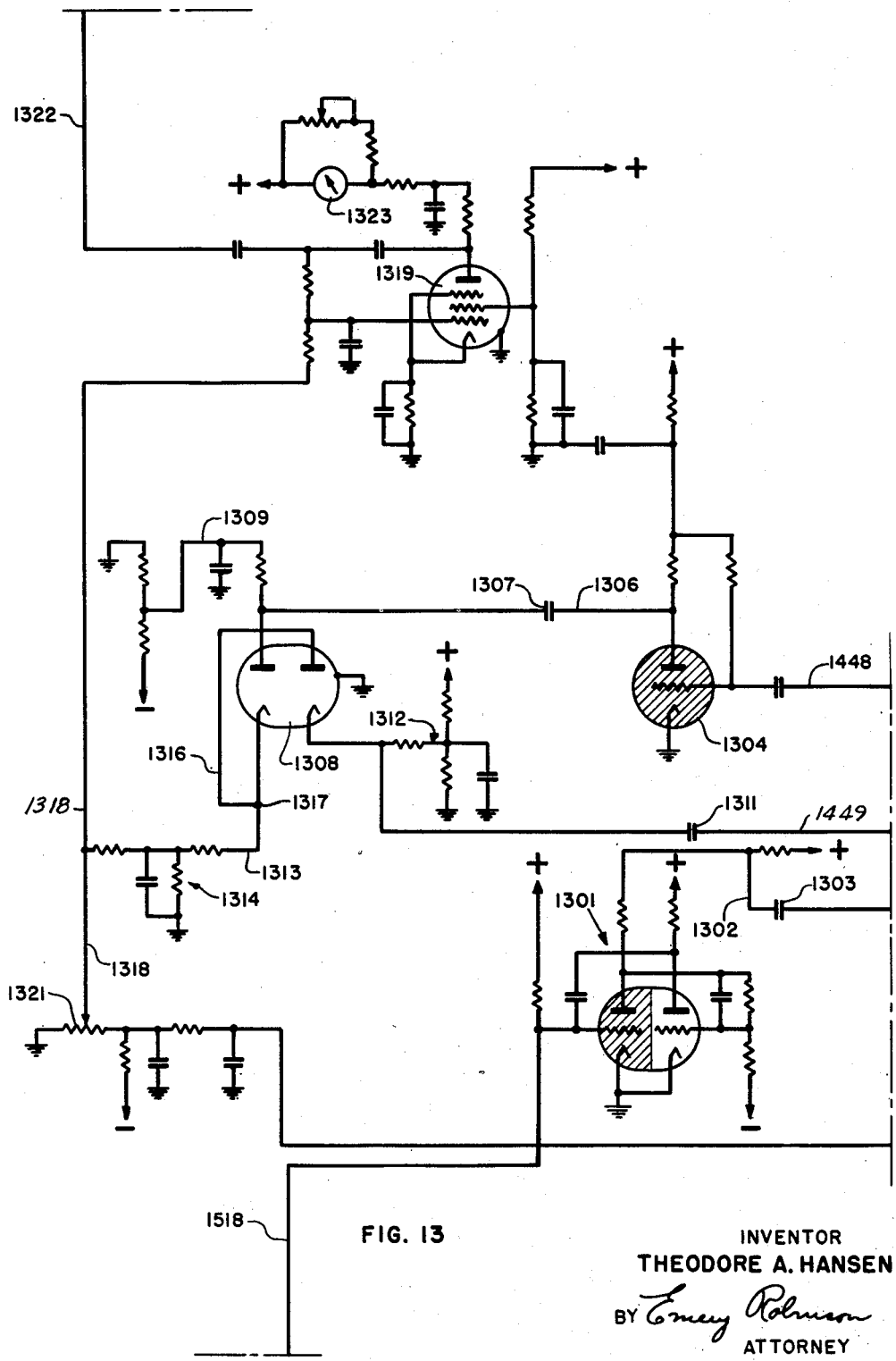
Figure 14:
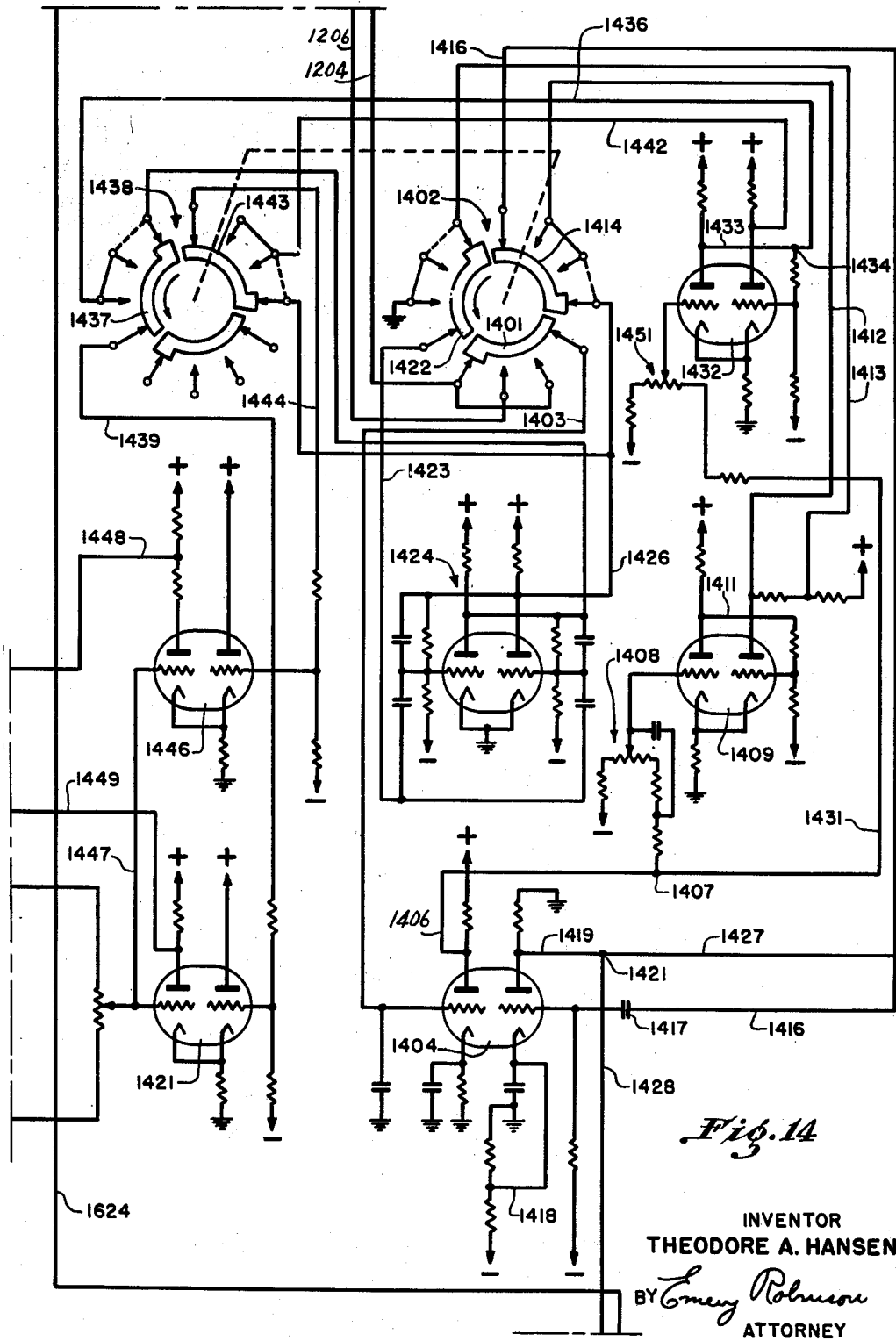
Figure 15:
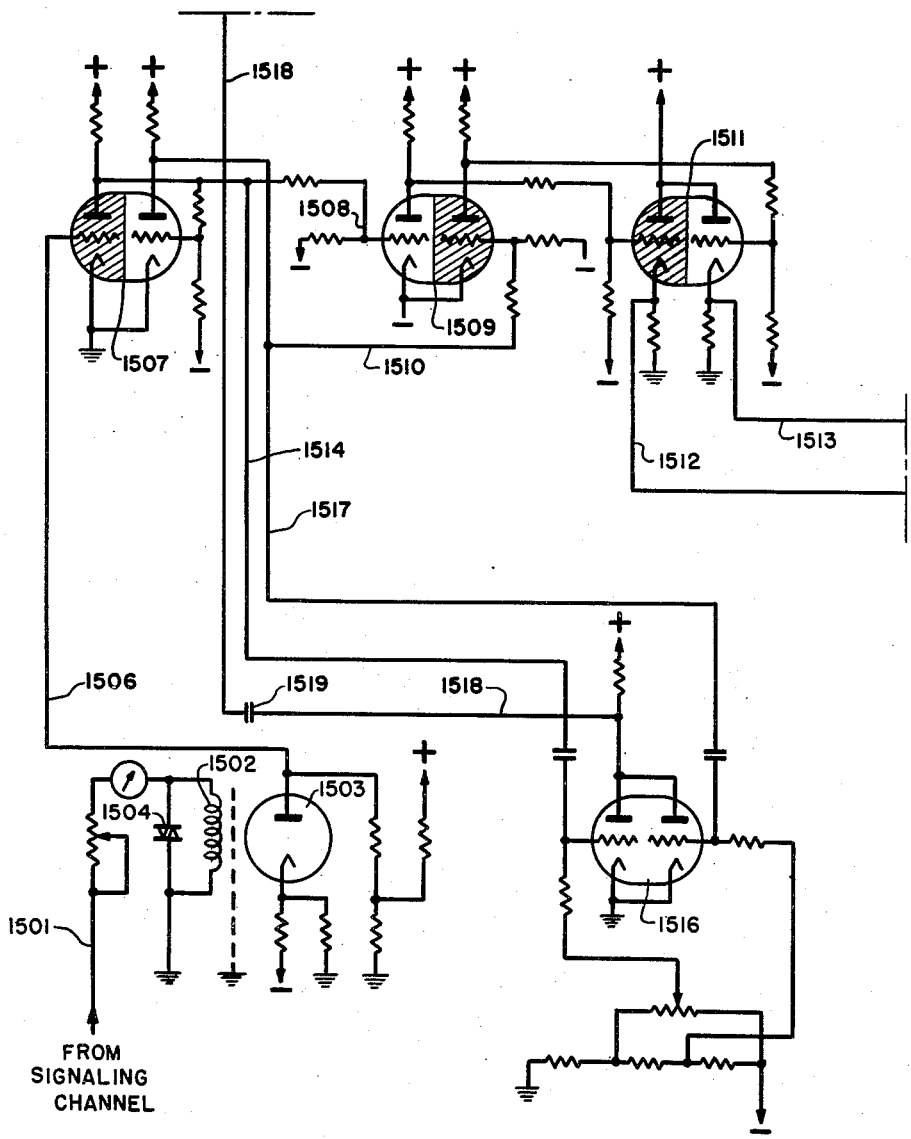
Figure 16:
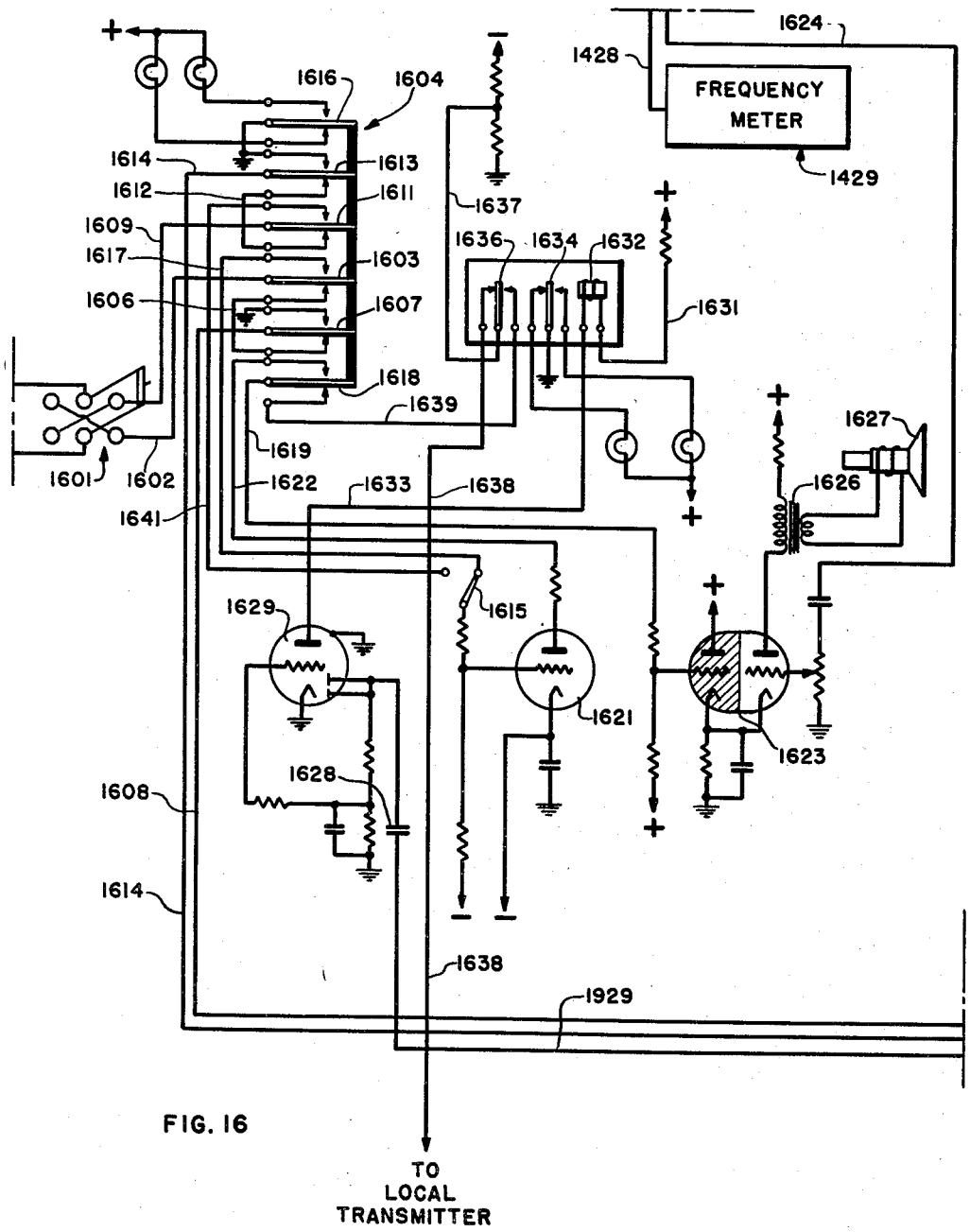
Figure 17:
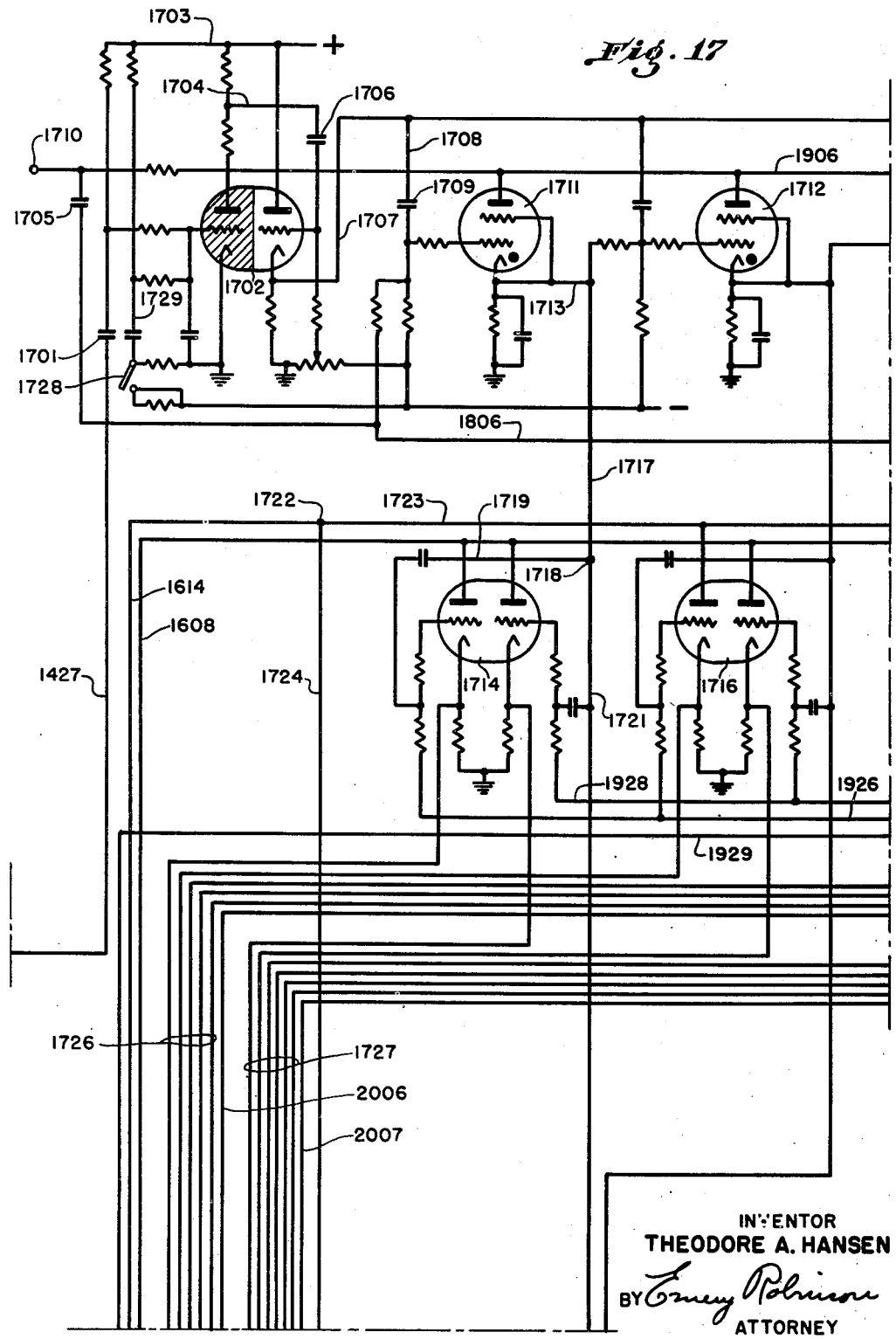
Figure 18:
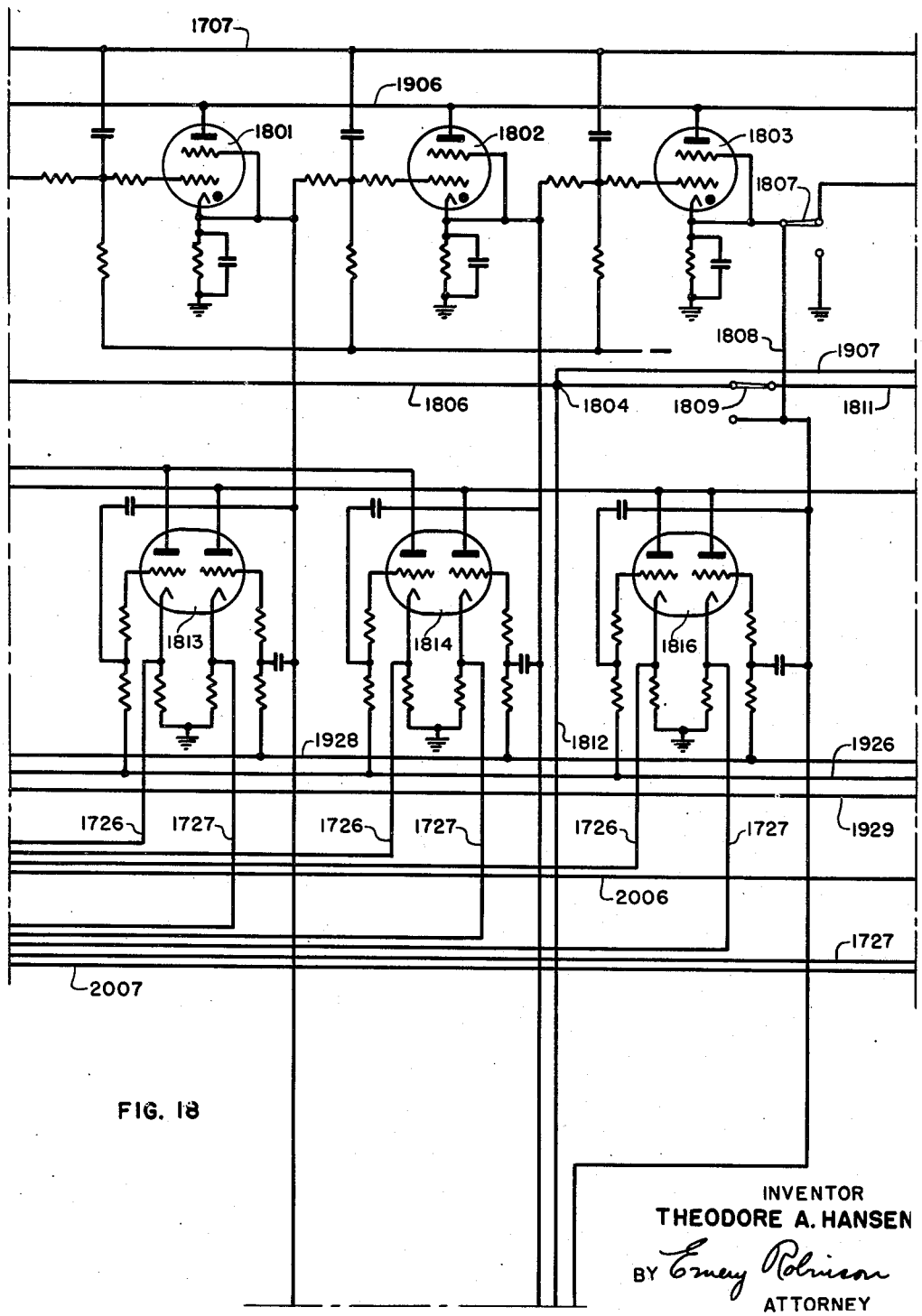
Figure 19:
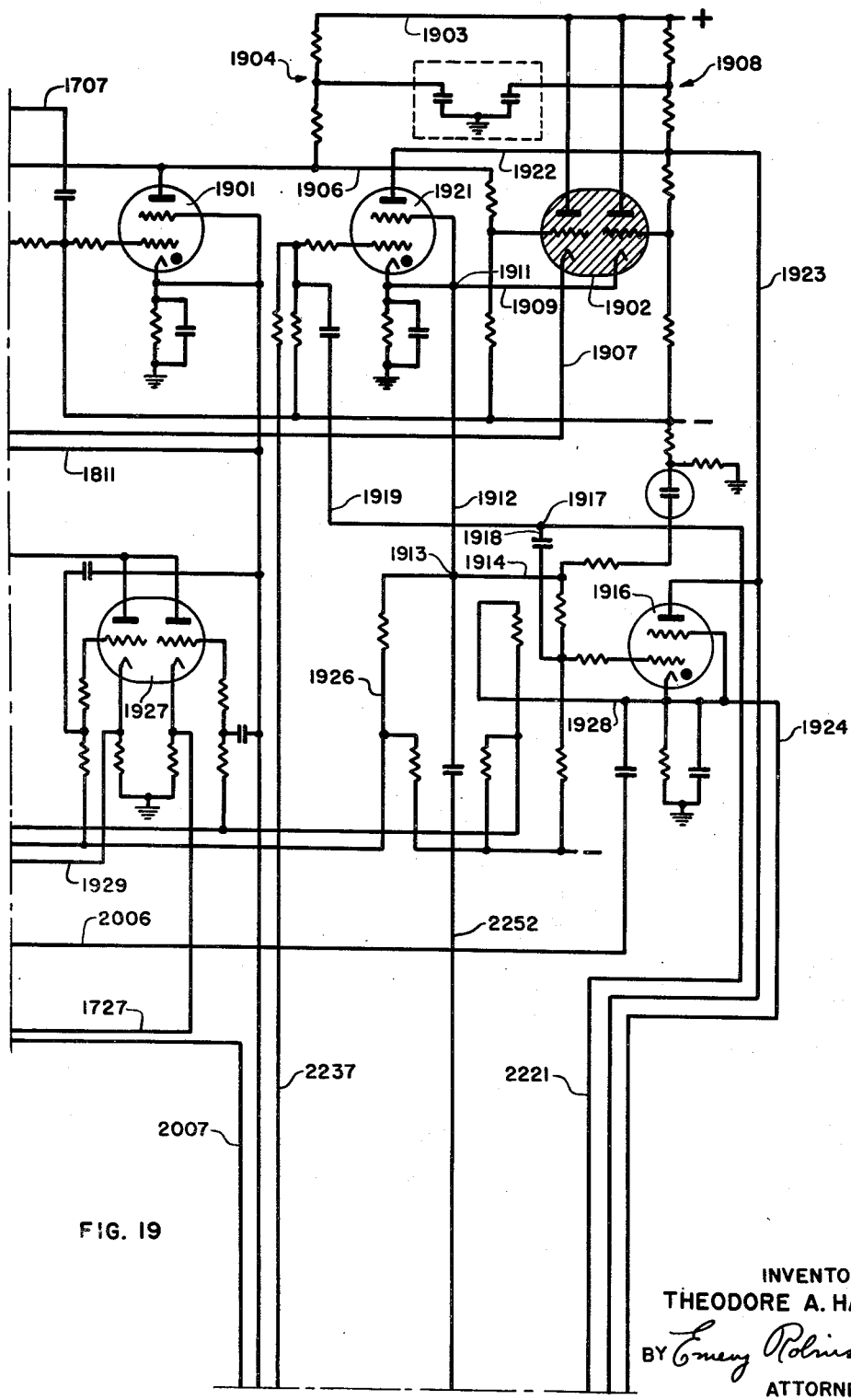
Figure 20:
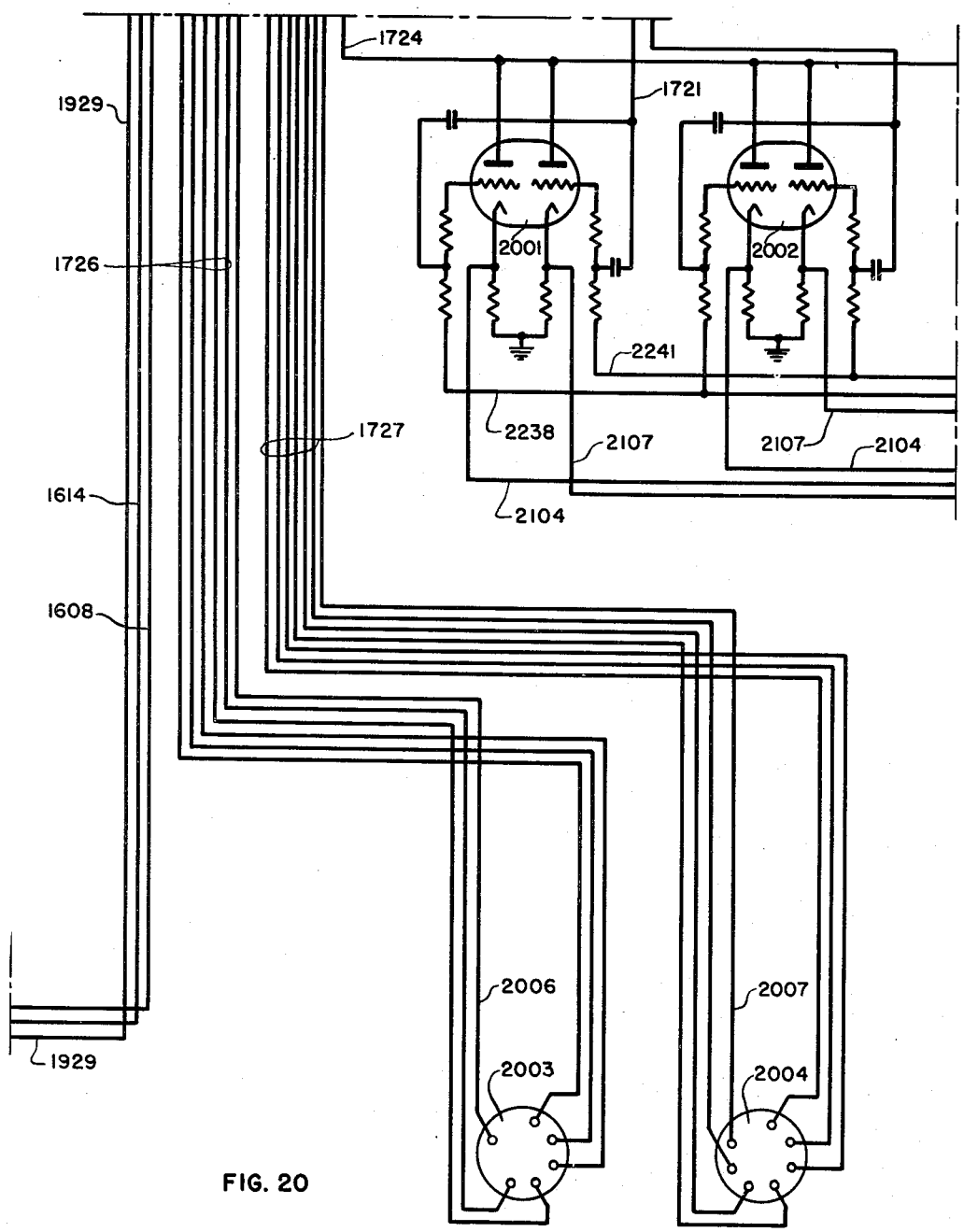
Figure 21:
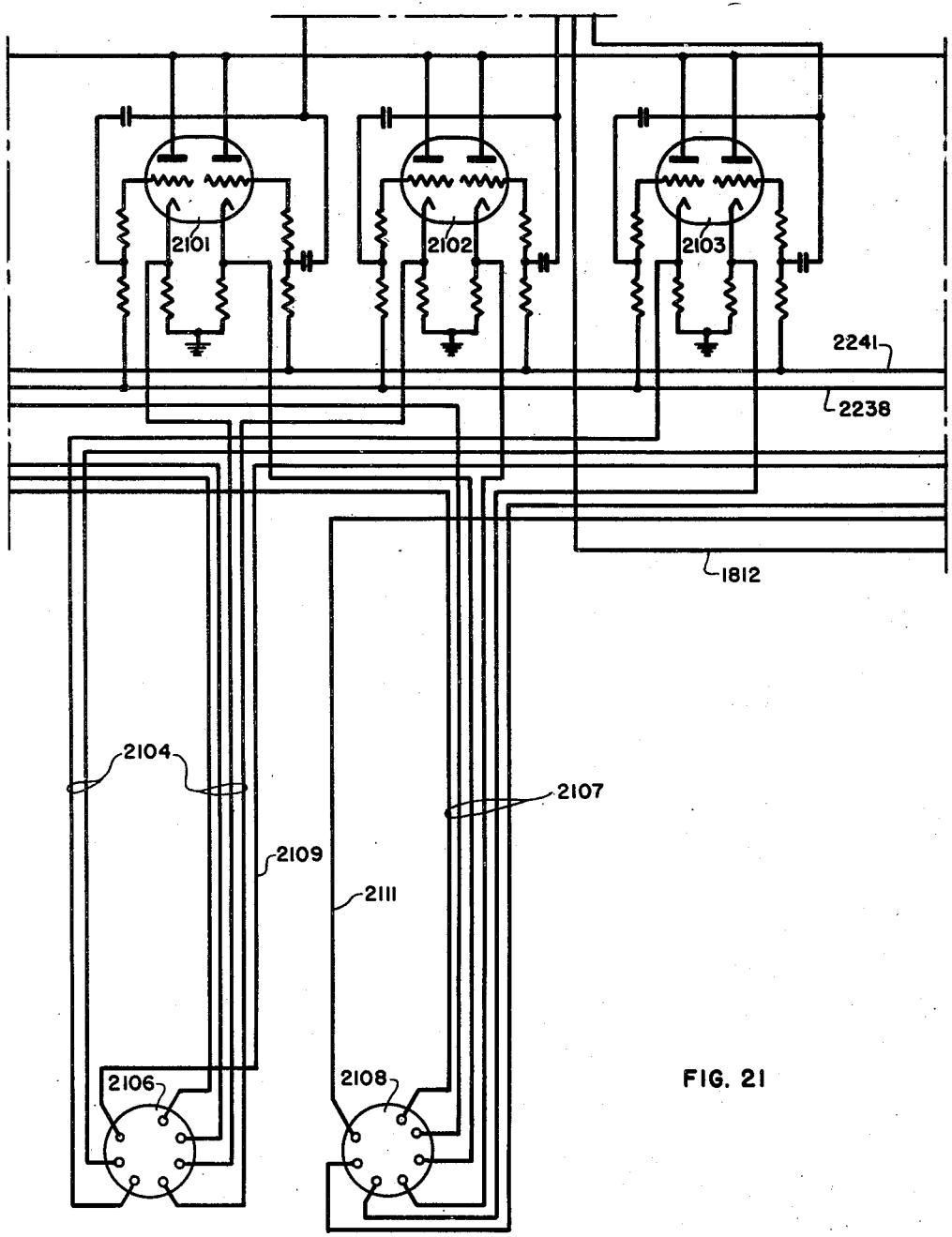
Figure 22:
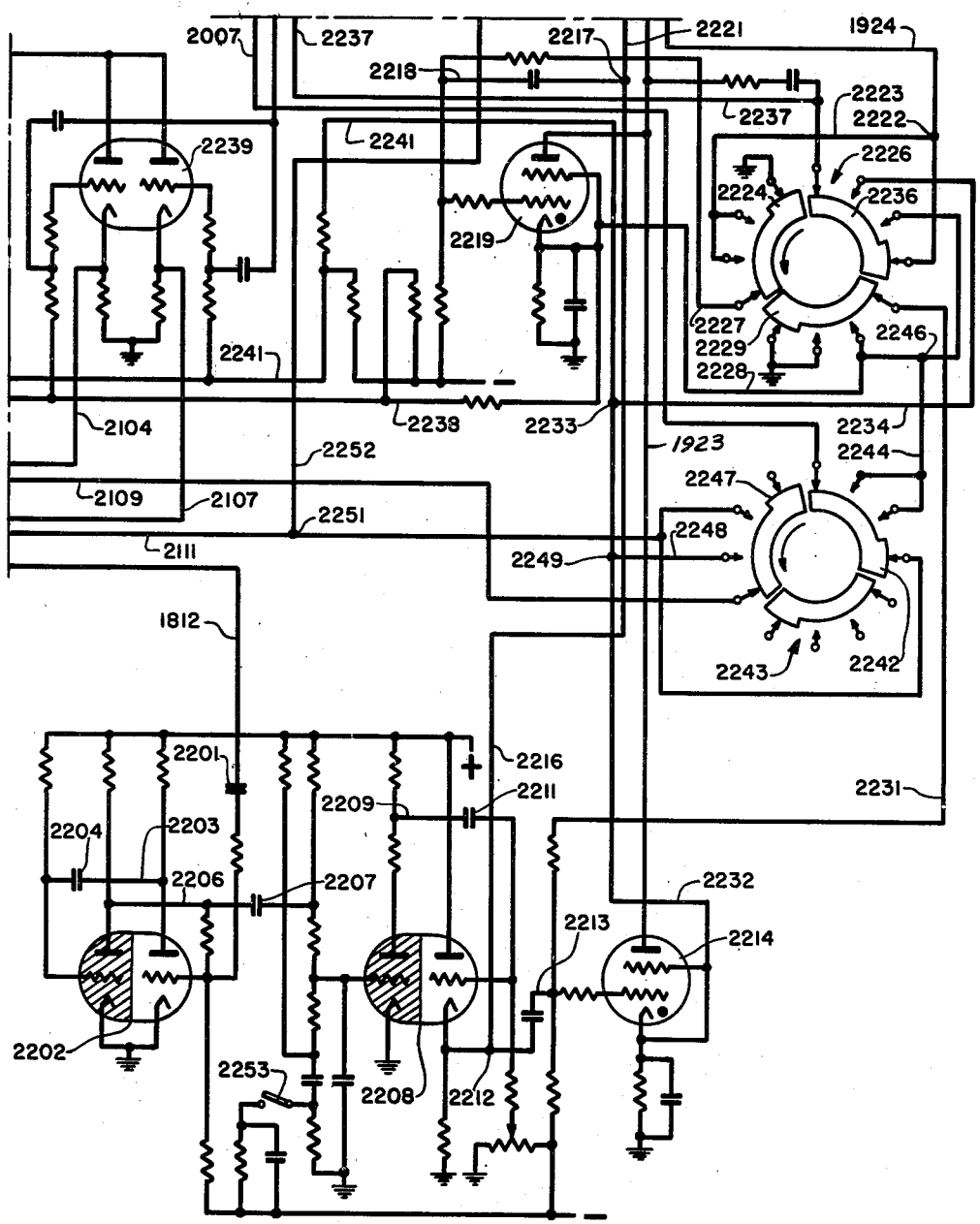

Figs. 12, 13, and 14 illustrate the receiver frequency drive, appropriate electronic components necessary for operation therewith and the corrector circuit for insuring that the receiving distributor will operate at the proper speed with respect to the received signals;

Figs. 15 and 16 illustrate the signal reception means from the signaling channel and a portion of the circuit continuity system;

Figs. 17 to 22, inclusive, illustrate the receiving multiplex distributor, and

Figure 23:
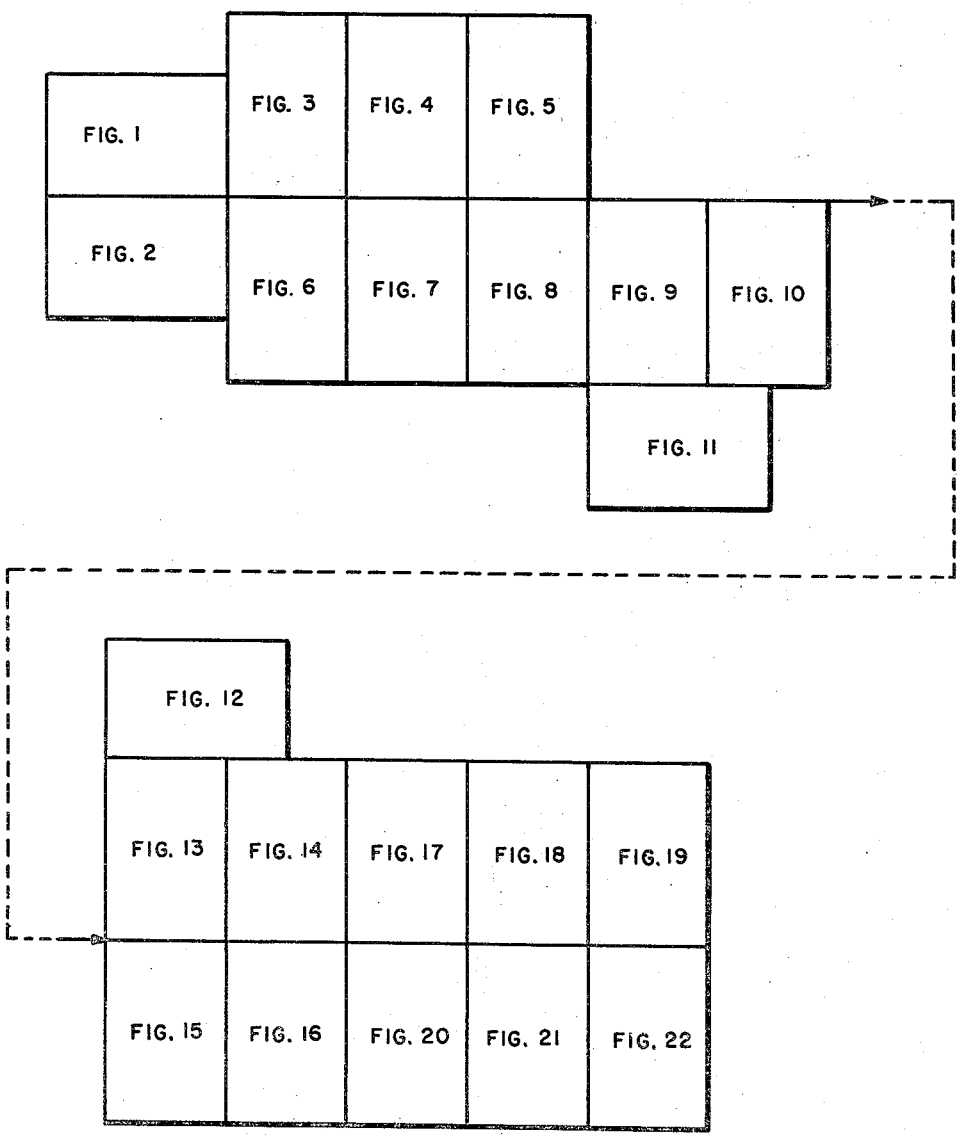

Fig. 23 illustrates in block diagram the arrangement of the various figures when taken together to illustrate the complete operating system.

In order for a full and complete understanding of the system and its apparatus components to be had it appears desirable to separate the various elements in the following description, with the system being described with respect to the operation thereof.

Transmitter drive

Figure 1:
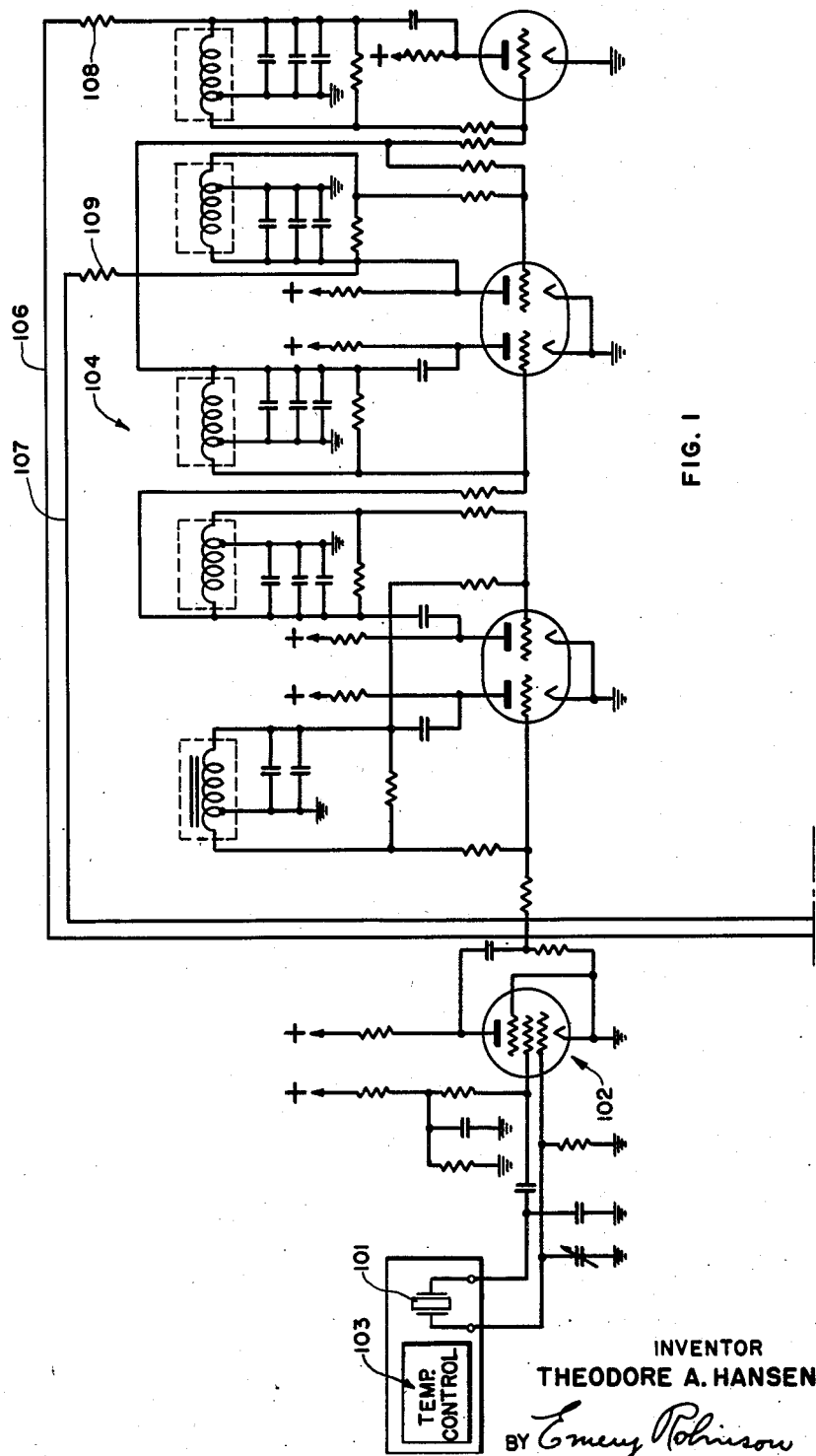
Figure 2:
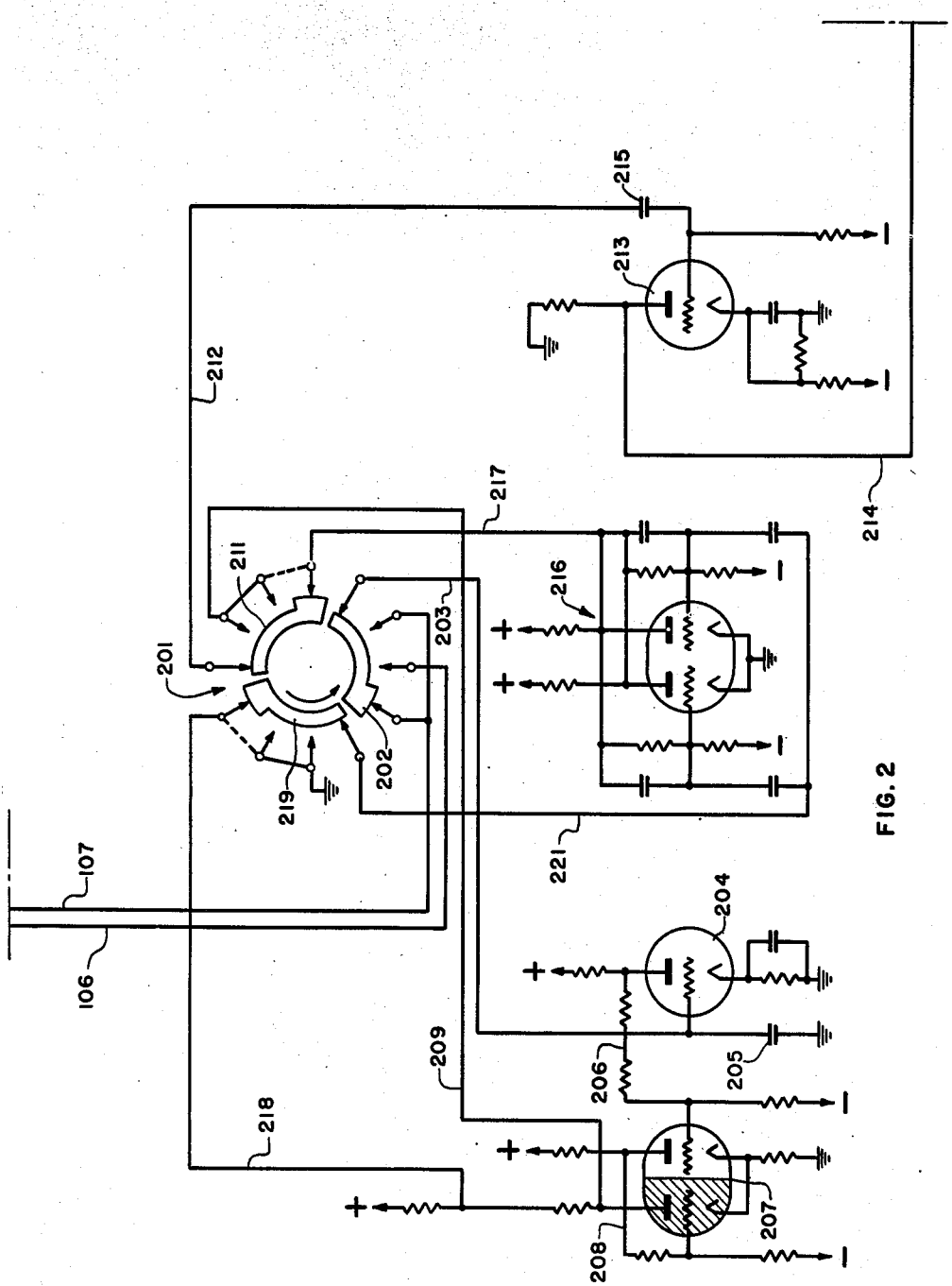
Figure 3:
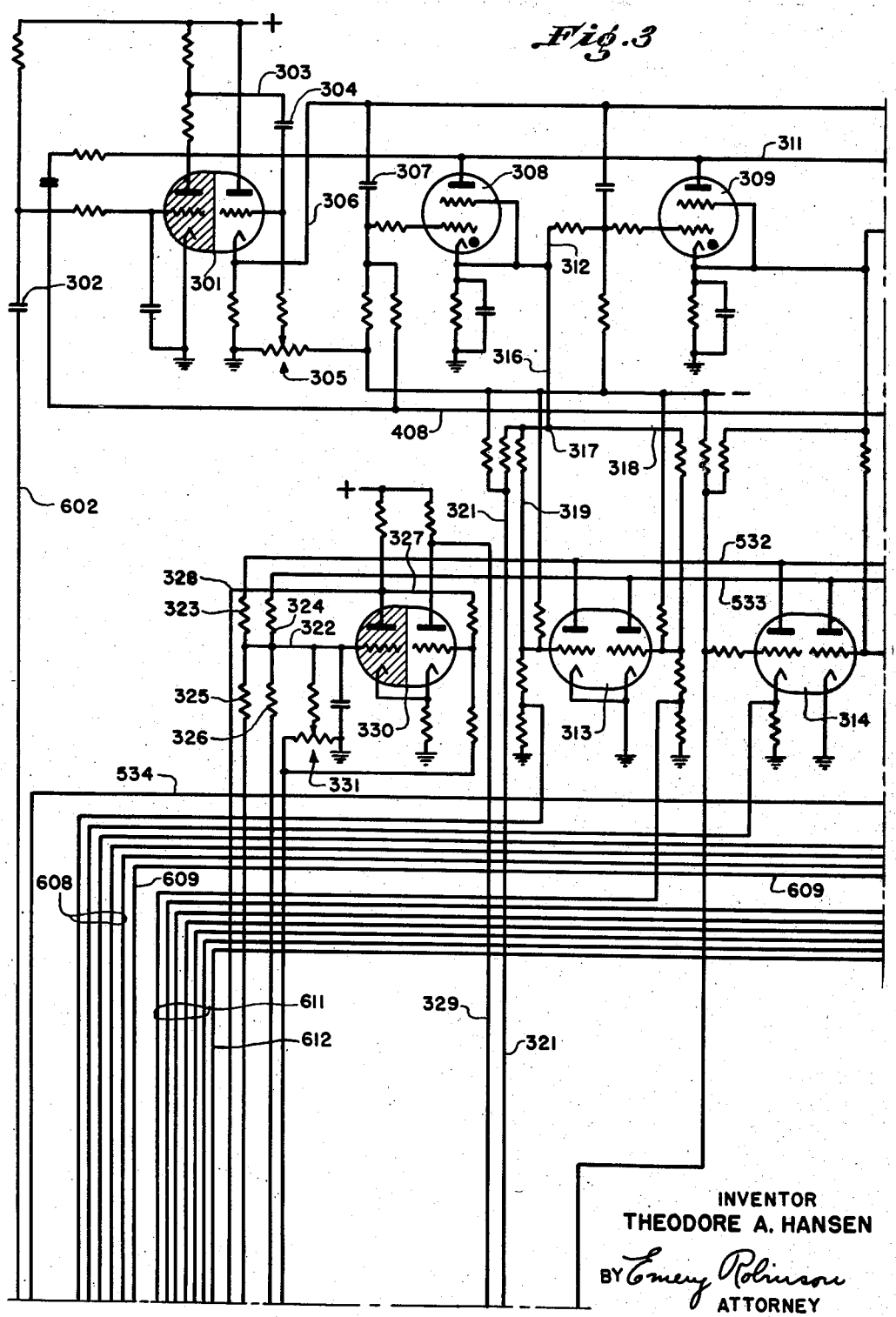
Figure 4:
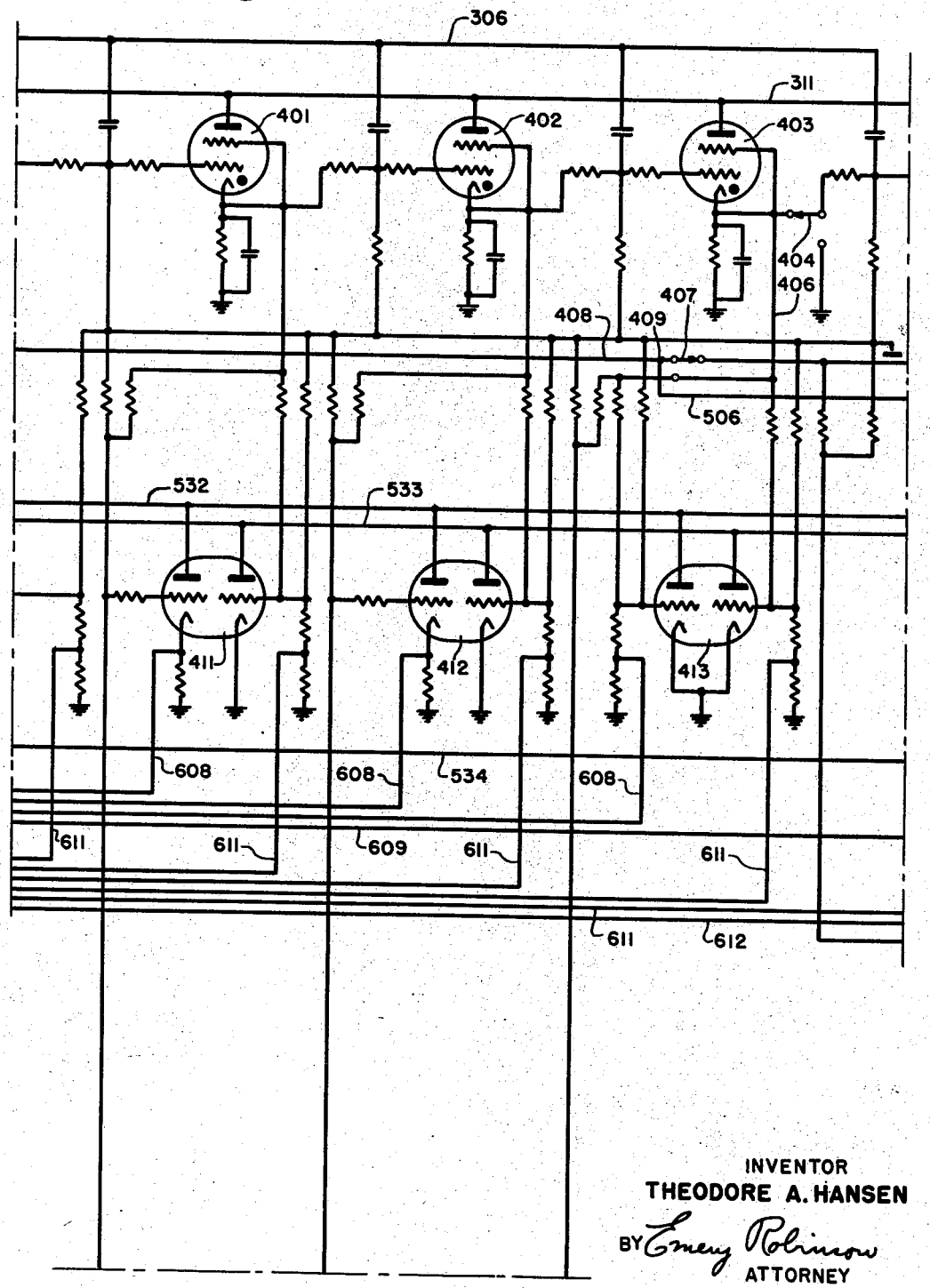

By referring to Figs. 1 and 2 an understanding of the crystal controlled frequency divider and its necessary control components for deriving a proper output frequency may be had. Fig. 1 discloses a quartz crystal 101 which is utilized in conjunction with an electron coupled oscillator tube indicated generally by the numeral 102 for deriving oscillations for use in the apparatus. It is not believed necessary to describe the crystal controlled electron coupled oscillator in detail inasmuch as it, and its operation, is well known in the oscillator art. The crystal is controlled as to its temperature by a temperature control unit indicated generally by the numeral 103 which may be of any commercial design obtainable and which is utilized to insure that a proper and constant frequency output may be obtained.

The output of the electron coupled oscillator is impressed on the first stage of a plural stage frequency divider indicated generally by the numeral 104. A complete description of the frequency divider is not deemed necessary in that such may be had by reference to U. S. Patent No. 2,410,389 issued to E. Norrman on October 29, 1946. With reference to the frequency divider it should be noted that two output conductors 106 and 107 are provided at different stages of the divider over which two different frequencies will be impressed and which will be utilized to operate the system with two, three or four channels, in a manner as will be described later. It might also be noted that the tuning condensers in the various stages of the frequency divider may be replaced by those of a different value if it is found desirable to operate the apparatus at greater or less speeds of operation.

The conductors 106 and 107 are connected through isolating resistors 108 and 109, respectively, to a selector switch, Fig. 2, indicated generally by the numeral 201. The selector switch 201 is of a type which may be positioned to one of three settings in accordance with whether it is desired to have two channel, three channel or four channel transmission. The switch 201 is illustrated in a two channel position, as are the other selector switches illustrated in the drawings, but the following description will be based on four channel operation and therefore it should be assumed by the reader that the switches, such as 201, have been positioned to the proper setting for four channel operation. In view of such an assumption the conductor 107 will be in engagement with a contact rotor 202 of switch 201 with the circuit then being traceable over a conductor 203 to the grid of a self-biased amplifier tube 204. The tube 204 has a condenser 205 connected from its grid to ground which acts as a low pass filter element in conjunction with the isolating resistor 108 or 109 to smooth out irregularities of output wave form of the frequency divider stage. A conductor 206 is connected in the anode circuit of the tube 204 with suitable coupling resistors, the opposite end thereof being connected to the grid of the right-hand portion of a twin triode 207, operating as a squaring amplifier. The grid of the right-hand portion of the triode 207 is normally biased negatively from any suitable source so that the tube will become conducting during portions of the impression of the input wave on the grid of the tube 204 but in an inverse order with respect to such tube. The cathode of the right-hand portion of the tube 207 is grounded through a resistor and the anode is connected to a positive source. The anode is connected over a conductor 208 and through a suitable resistor to the grid of the left-hand portion of the twin triode 207. Because of such connection and even though the grid of the left-hand portion is biased negatively, the left-hand portion of the tube 207 will be normally conducting. At such times, however, as the right-hand portion of the tube 207 conducts, the conductor 208 will go negative and the left-hand portion of the tube 207 will be rendered nonconducting. Upon the left-hand portion of the tube 207 becoming rendered nonconducting, a conductor 209 connected to the positively biased anode of the left portion of the tube 207 will receive the square-wave output of the tube which is impressed to complete a circuit through a rotor contact 211 of the selector switch 201 and thence over a conductor 212 to the grid of a vacuum triode 213. The grid of the triode 213 is normally biased negatively, beyond cutoff, and the cathode is connected to a negative source. As a result of such connections, at such time as the grid of tube 213 receives the positive impulse through a differentiating condenser 215 the tube will conduct with a negative impulse being impressed over a conductor 214. In describing the above elements generally, it might be noted in recapitulation that the output of the frequency divider 104 is amplified by the tube 204, is squared by the twin triode 207, and is then reduced to negative impulses by the tube 213. The negative impulses on the conductor 214 will be in accordance with the frequency of the drive unit and will be utilized to step the transmitting distributor in a manner as will be described.

If it is desired to utilize three channel transmission the selector switch would be so positioned that the conductor 106 would be connected to the contact rotor 202 and thus would complete a circuit over the conductor 203 for amplification, squaring, and pulse generation.

If two channel operation is desired the selector switch 201 would be positioned as illustrated, allowing operation of an Eccles-Jordan 2/1 divider circuit indicated generally by the numeral 216, which will generate impulses over a conductor 217, through the bus 211, and thence over the conductor 212, and through the pulse generating tube 213. When two channel operation occurs the divider output on the conductor 107 will be utilized, through the contact rotor 202, the amplifier 204, and the squarer 207, to supply potential over a conductor 218 to a contact rotor 219 of the switch 201 and thence over a conductor 221 for operation of the Eccles-Jordan circuit 216. Eccles-Jordan flip-flop circuits are well known in the art, and so no detailed description thereof is deemed necessary.

*Transmitter multiplex distributor*

With reference to Figs. 3 to 8, inclusive, there is disclosed the transmitting multiplex distributor which forms a portion of the present invention. The negative drive impulses, described previously, are impressed over the conductor 214 to a junction point 601 and thence over a conductor 602 to the grid of the left-hand portion of a twin triode 301. The left-hand portion of the triode 301 is normally conducting, the anode and grid thereof being connected to a source of positive battery. Each negative impulse on the conductor 602 will cause the left-hand portion of the tube 301 to be rendered nonconducting, such occurring momentarily only because of condenser 302 being intermediate the source of negative impulses and the grid of the tube. Each time that the left-hand portion of the twin triode 301 becomes nonconducting, its anode potential will increase, thereby causing conductor 303, connected to such anode, to increase in potential with an impulse being passed through a condenser 304 to the normally negatively biased grid of the right-hand portion of the twin triode 301. The right-hand portion of the triode 301 will then become conducting, its anode being connected to positive battery, resulting in a positive impulse being impressed on a common conductor 306 connected to the cathode of the tube. The twin triode 301 is in effect an amplifier for converting the negative impulses to positive impulses. A potentiometer 305 is for the purpose of setting the output level of the driving pulses to an optimum operating level.

The conductor 306 is connected electrically through individual condensers such as 307 to the control grids of gas filled Thyratron tubes 308, 309, 401, 402, 403, and 501. These latter described tubes form an electronic impulse distributor of the type that will operate in a ring, succeeding tubes conducting through conditioning by a preceding tube and the receipt of an operating impulse on the conductor 306 from the frequency drive. Further, these tubes are of the type that once rendered conducting, continue to do so irrespective of grid potential unless an alteration occurs in the anode or cathode circuits.

The anodes of the six distributor tubes are connected by a common conductor 311, through a common anode resistor 502 to a source of positive battery. The common anode resistor is of such a type that upon any of the tubes connected in circuit therewith becoming conducting, any other tube in circuit therewith which might be conducting will be extinguished. The conductor 311 is also connected through a resistor to the normally negatively biased grid of the left-hand portion of a twin vacuum triode 503. Referring again to the distributor tubes it may be seen that the cathodes thereof are grounded through a resistor with a condenser being in shunt relationship therewith. The use of such condenser and resistor combination is necessary when a common anode resistor is utilized, the theory of operation of the same being described fully in U. S. Patent No. 2,412,642, issued to Wilkerson on December 17, 1946. The cathodes of the various tubes are connected over a conductor and through a pair of resistors to the control grid of the succeeding tube in the ring, such for instance, as the conductor 312 interconnecting the tubes 308 and 309. The cathode of the tube 403 is connected to the control grid of the tube 501, through a movable switch 404. In this manner, if it is desired to transmit five unit code only, the switch 404 will be positioned not as shown but in engagement with its grounded connection, thereby preventing operation of the tube 501. However, when positioned as shown, it will transmit six unit code. The cathode of the tube 403 is connected by a conductor 406 to one contact point of a movable switch 407, whereas the cathode of the tube 501 is connected over a conductor 504 to a second contact point of the switch 407. The movable contact of the switch 407 is connected over a conductor 408 to the control grid of the tube 308. Thus, depending on whether five or six unit code is being transmitted either the tube 403 or 501 will be utilized to condition the control grid of the tube 308 and thus complete the distributor ring operation. The switch 407 is illustrated as being in position for the transmission of six unit code, as is the switch 404.

Referring now to the left-hand portion of the triode 503, which serves as the automatic start tube for the impulse distributor, mentioned previously as being connected to the common anode resistor 502 through the common conductor 311, it will be noted that such tube will be normally conducting as its grid is connected over the conductor 311, through the common anode resistor 502, to the positive source of battery, whereas, the anodes of the gas tubes connected in circuit thereto will have no effect at this time as all of the gas tubes are extinguished, and the common bus 311 is at a high potential. It is assumed that no drive pulses are being received on the conductor 306. During the time that the left-hand portion of the tube 503 is conducting, positive potential will be impressed over a conductor 506 which is connected in the cathode circuit of that tube and thence to the conductor 408 at junction point 409. The circuit may be further traced over the conductor 408 to the grid of the first distributor tube 308. The distributor tube 308 will not be rendered conducting at this time as the potential received from the output of the tube 503 is not sufficiently high to cause the gas Thyratron tube to conduct. However, under such a condition, upon the right portion of the triode 301 being rendered conducting, with the resultant positive potential applied to the grid of the tube 308, over the conductor 306 and through the condenser 307, the tube 308 will be rendered conducting. This operating impulse on the conductor 306 will have no effect on any of the other tubes 309, 401, 402, 403, and 501 because none of them are receiving a conditioning potential on their control grid at this time. Upon the tube 308 becoming conducting and as its anode is connected to the common conductor which is also connected to the grid of the left-hand portion of the triode 503 and the common anode resistor 502, the left-hand portion of the tube 503 will be blocked due to a negative grid potential resulting from the potential of the anode bus 311 dropping from a high to a low value when the distributor circuit operates. It was previously mentioned that the output of the tube 308, when conducting, was utilized to condition the tube 309 by means of a conductor 312. Therefore, with tube 308 conducting and upon receipt of the next positive impulse to the common conductor 306, the grid of the tube 309 will be driven sufficiently less negative to allow that tube to conduct. As soon as tube 309 becomes conducting the potential of the anode bus 311 falls sharply to a very low value, causing the tube 308 to be extinguished. Thereafter as succeeding impulses are directed on the common conductor 306 the distributor will continue to step in chain operation, one tube thereof becoming conducting after the preceding one and causing the preceding one to be extinguished. Also, during continued operation of the various distributor tubes and because of the common anode resistor 502, the left-hand portion of the twin triode 503 will remain nonconducting.

It should be noted that the right-hand portion of the twin triode 503 is also normally conducting, its grid being connected over a common conductor 507 and through a common anode resistor 508 to a source of positive battery. Also connected to the common conductor 507 is the anode of a gas filled tube 509, the anode of a gas filled tube 511, the anode of a gas filled tube 801, and the anode of a gas filled tube 802. The four gas tubes just mentioned, namely, 509, 511, 801 and 802, form a channel distributor and are interconnected and operate in much the same manner as was described with respect to the impulse distributor. During the time that the right-hand portion of tube 503 conducts a potential will be impressed from its cathode over conductor 512 to junction point 513, over a conductor 514 to junction point 516, and thence over a conductor 517 and through appropriate resistors to the control grid of the channel distributor tube 511. There is not sufficient potential on the grid to cause the tube 511 to conduct at this time but the potential applied thereto acts as a conditioning potential. At such time as the tube 403 or 501 conducts, depending on whether the switches 404 and 407 are positioned for five or six unit code transmission, an impulse will be impressed on the conductor 506 from the cathode circuit of either of these tubes and through the switch 407, to junction point 518, and thence over a conductor 519 through a condenser 804 to the grid of the normally conducting left-hand portion of a twin triode 803. This will have no effect at this time as the left-hand portion of tube 803 is normally conducting, its grid and anode being connected to a source of positive potential. However, as the distributor then steps in its ring operation with the No. 1 tube 308 being rendered conducting and the tubes 403 or 501, whichever is conducting, being extinguished, a negative impulse will be impressed on the conductor 519 and through the condenser 804 to the grid of the left-hand portion of the tube 803 causing that portion of the tube to be rendered nonconducting. As the left-hand portion of the tube becomes nonconducting its anode potential will rise causing an impulse to be impressed through a condenser 805 to a conductor 807 and thence to the normally negatively biased grid of the right-hand portion of the twin triode 803. Such impulse will be sufficient to overcome the negative bias and cause the right-hand portion of the tube 803 to be rendered conducting. Upon such tube becoming conducting, which is momentarily only, a positive impulse will be applied from its cathode to a common conductor 808 which is connected to the grid of the tube 802 through a condenser 809, to the grid of the tube 801, over a conductor 811 and through a condenser, to the grid of the tube 511 over a conductor 521 and through a condenser, and over a conductor 522 and through a condenser to the grid of the tube 509. At this time, however, tube 511 will be the only tube which will be rendered conducting as it had received a conditioning potential on its grid from the output of the right-hand section of the channel distributor automatic start tube 503. The right-hand portion of the tube 803 conducts momentarily only, as stated above, but the tube 511 will continue to conduct because it is a gas tube and of the type which continues to conduct irrespective of grid potential once it has been rendered conducting. Upon the tube 511 being rendered conducting and because its anode is connected to the common conductor 507, which is also coupled to the grid of the right-hand portion of the triode 503, the right-hand portion of such latter tube will become nonconducting. Also, at such time as the tube 511 conducts, potential will be impressed from its cathode to a conductor 523, to junction point 812 and thence over a conductor 813 to a spring clip associated with a contact rotor 814 of a selector switch indicated generally by the numeral 816. The selector switch 816 is shown in a position for two channel operation but if it be assumed that it is set for four channel operation the partly traced circuit, just described, will be completed from the contact rotor 814 over a conductor 817, and through appropriate resistors to the control grid of the succeeding channel distributor tube 801. The tube 801 will not conduct at this time, such potential being of the conditioning variety only. However, at such time as the Number 5 or 6 distributor tubes 403 or 501 are extinguished with the resulting conduction of the right-hand portion of the triode 803 and the positive impulse to the conductor 808, the tube 801 will be rendered conducting. Likewise, at this time, the tube 511 will be extinguished due to the action of the common anode resistor 508, described previously.

The channel distributor composed of the tubes 509, 511, 801, and 802 will continue to operate in a ring fashion after the manner just described above. It may be seen from this description that the impulse distributor and the channel distributor both operate similarly with respect to ring action, the difference being that the channel distributor is operated by the impulse distributor and not by impulses from the frequency drive.

It may be noted in order to complete a description of the conditioning circuits of the channel distributor tubes that at such times as tube 801 is conducting potential will be impressed from its cathode circuit to a conductor 818, to junction point 819, and thence to a rotor contact 821 of the selector switch 816. Assuming that the selector switch has been set for four channel operation the circuit may be further traced over conductor 822 to the control grid of the channel distributor tube 802. Likewise, at such time as tube 802 is conducting positive potential will be impressed from its cathode to a conductor 823, to junction point 824, and thence to a contact rotor 826 of the selector switch 816. Assuming again that the selector switch is set for four channel operation the circuit may be further traced from the contact rotor 826 to a conductor 827 and through appropriate resistors to the control grid of the channel distributor tube 509. Likewise, during the interval of conduction of the tube 509, potential is impressed from its output cathode circuit to the junction point 513, over the conductor 514 to the junction point 516, and then over the conductor 517 to the grid of the tube 511, for conditioning this tube.

The selector switch 816 is so wired that if it is set for two channel operation two of the channel distributor tubes will not be in circuit and if it is set for three channel operation one of the tubes will be dropped from circuit.

By reference to all the Figs. 3 to 8, inclusive, it may be seen that a plurality of vacuum matrix tubes 313, 314, 411, 412, 413, and 524 are provided for the A and B channels of transmission and 603, 604, 701, 702, 703, and 828 for the C and D channels of transmission. The left-hand portion of the twin triodes 313, 314, 411, 412, 413, and 524 are utilized for the A channel, the right-hand portion of such tubes being utilized for the B channel. The same is true with respect to the C and D channels, the C channel utilizing the left portion of the tubes and the D channel the right portion of the tubes assigned to the C and D channels.

During the time that the impulse distributor tube 308 is conducting the potential which was described previously for conditioning the succeeding tube 309 over the conductor 312 will also be impressed on a conductor 316 to a junction point 317 and thence over a conductor 318 and through a coupling resistor to the grid of the right-hand portion of the tube 313 which is normally biased negatively. The potential applied to the grid at this time is not sufficient to cause that portion of the tube to be rendered conducting but other conditions must also exist, as will be described hereinafter. The same potential impressed at junction point 317 will be impressed on a conductor 319 and thence to the normally negatively biased grid of the left-hand portion of the tube 313. The potential impressed at junction point 317 will also be impressed on a conductor 321 and thence to both of the normally negatively biased grids of the right-hand and left-hand portions of the tube 603. As was true with respect to the right-hand portion of the tube 313, the left portion of that tube and both portions of the tube 603 will not conduct at this time unless other conditions exist. Thus, it may be seen that at such time as the No. 1 impulse distributor tube is conducting it will apply a potential to the grids of the matrix tubes assigned the No. 1 impulse position for the four channels A to D, inclusive.

It is not deemed necessary to repeat a description of the remainder of the matrix tubes and how they receive potential from their corresponding distributor tubes. However, it should be noted during the interval that No. 2 distributor tube 309 is conducting, potential will be applied to the grids of the No. 2 impulse position tubes 314 and 604, for four channels A to D, inclusive. By tracing the circuits from the remaining distributor tubes it may be seen that they apply potential to their associated matrix tubes similarly.

During the interval that the A channel distributor tube 509 is conducting potential will be derived in its cathode circuit as described previously, which is impressed to the junction point 513 and thence over the conductor 514 to the junction point 516. The circuit may be further traced over conductor 526 to the cathode of the left-hand portion of a twin triode 527. The left-hand portion of the twin triode 527 is normally conducting by reason of positive battery being applied over conductor 528 to the grid thereof. However, at such time as the positive potential is applied to the cathode of the left-hand portion of the tube, its grid will no longer be positive with respect to its cathode and thus the tube will be rendered nonconducting.

Figure 5:
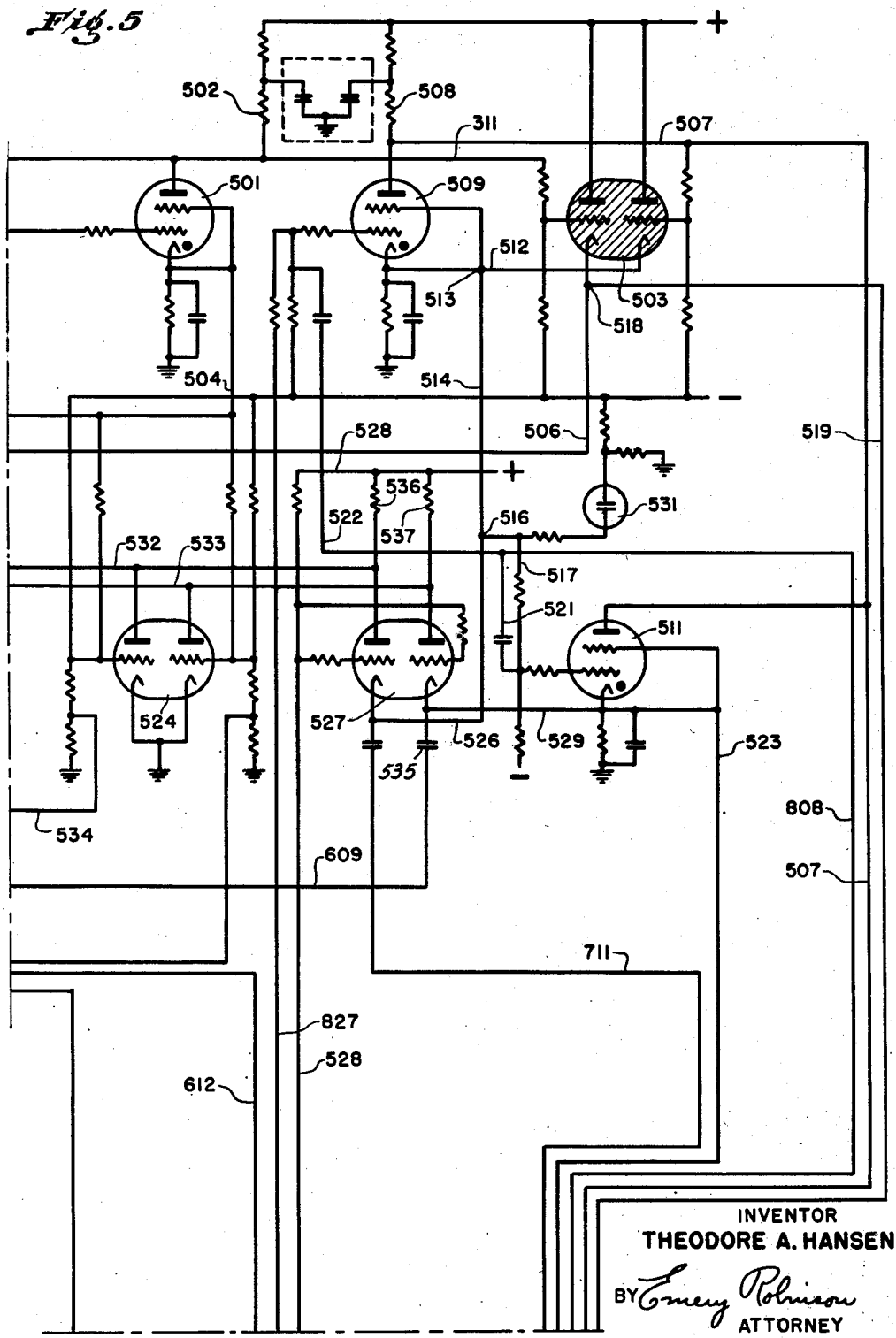
Figure 6:
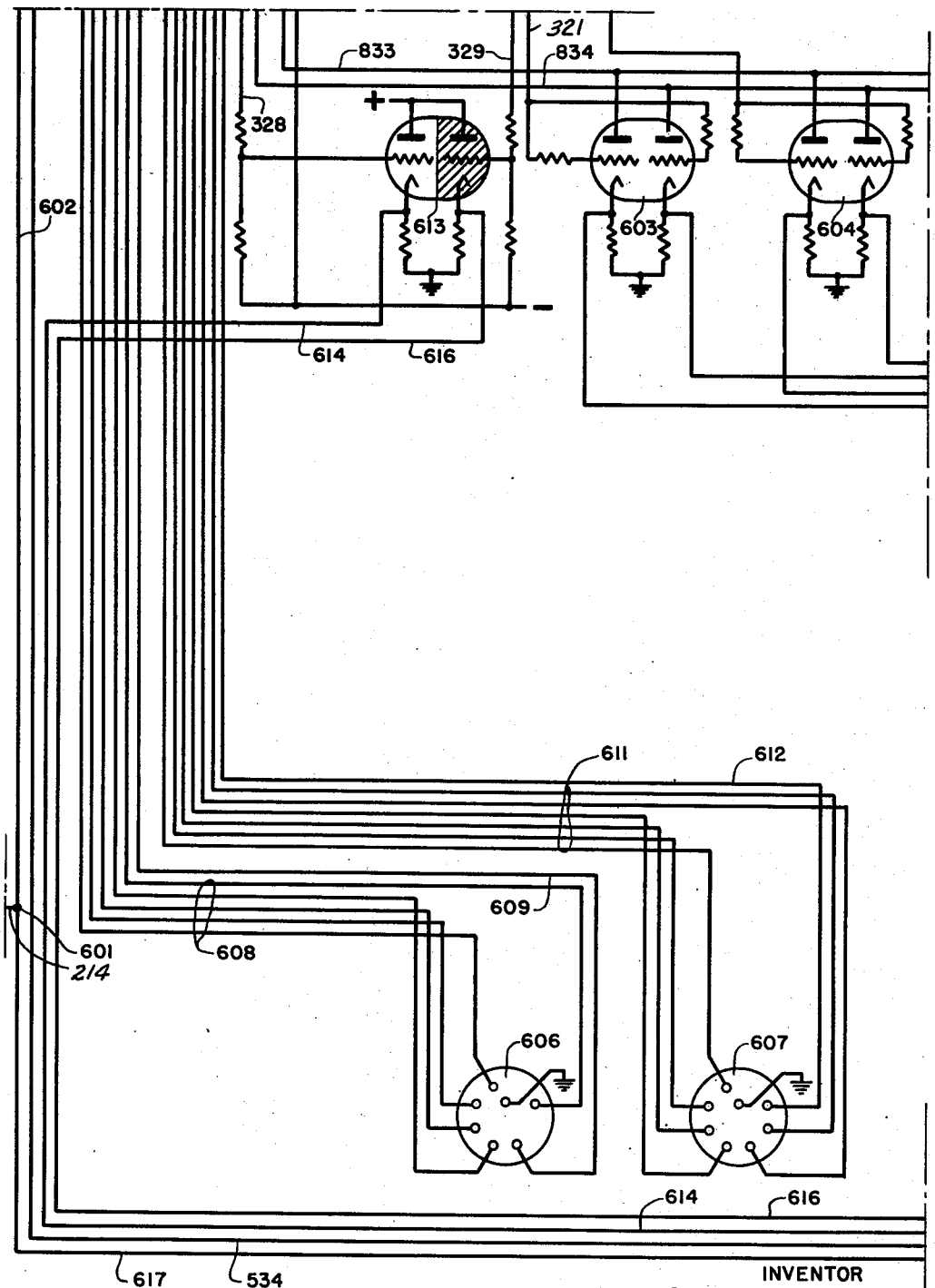
Figure 7:
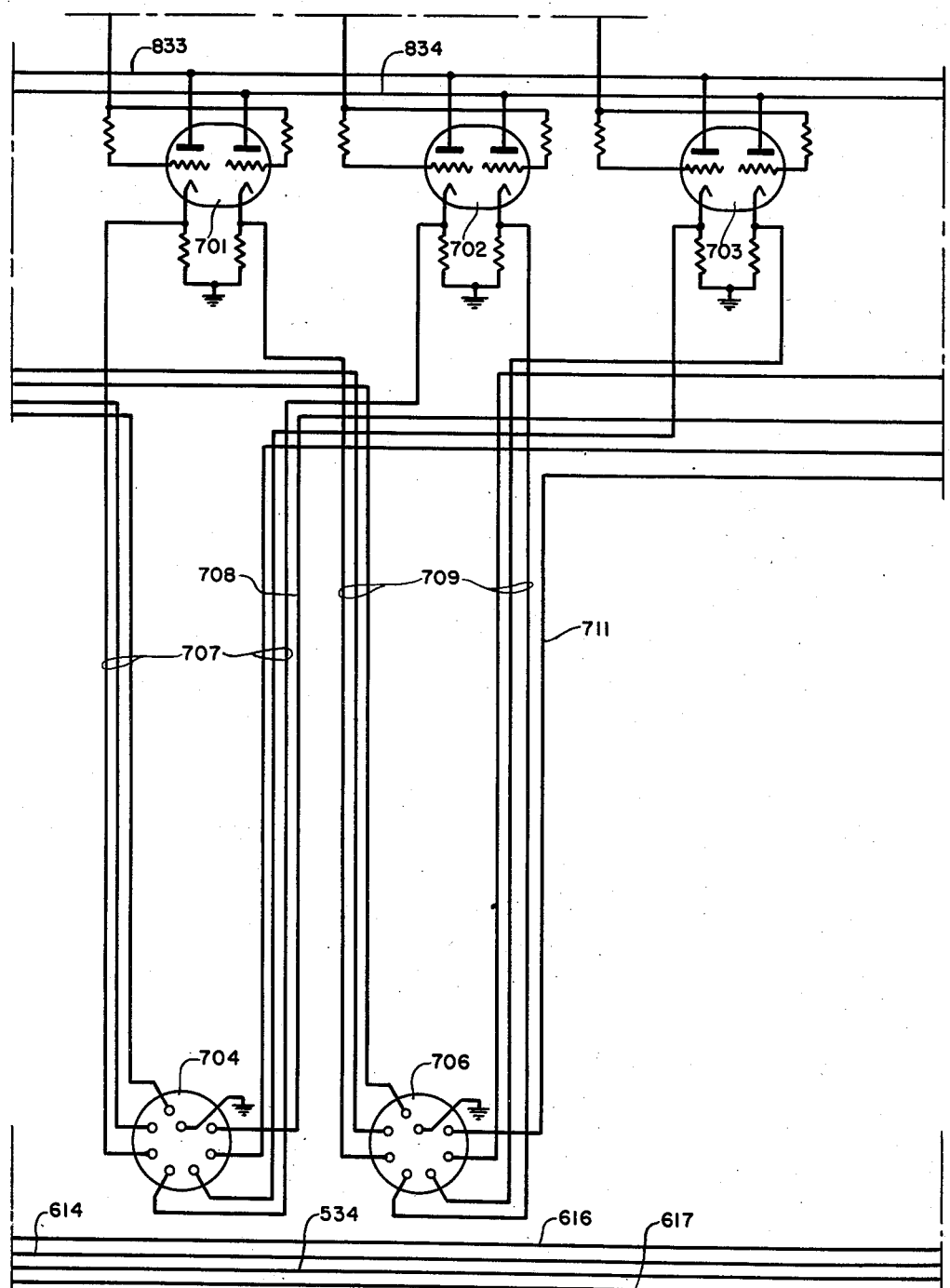
Figure 8:
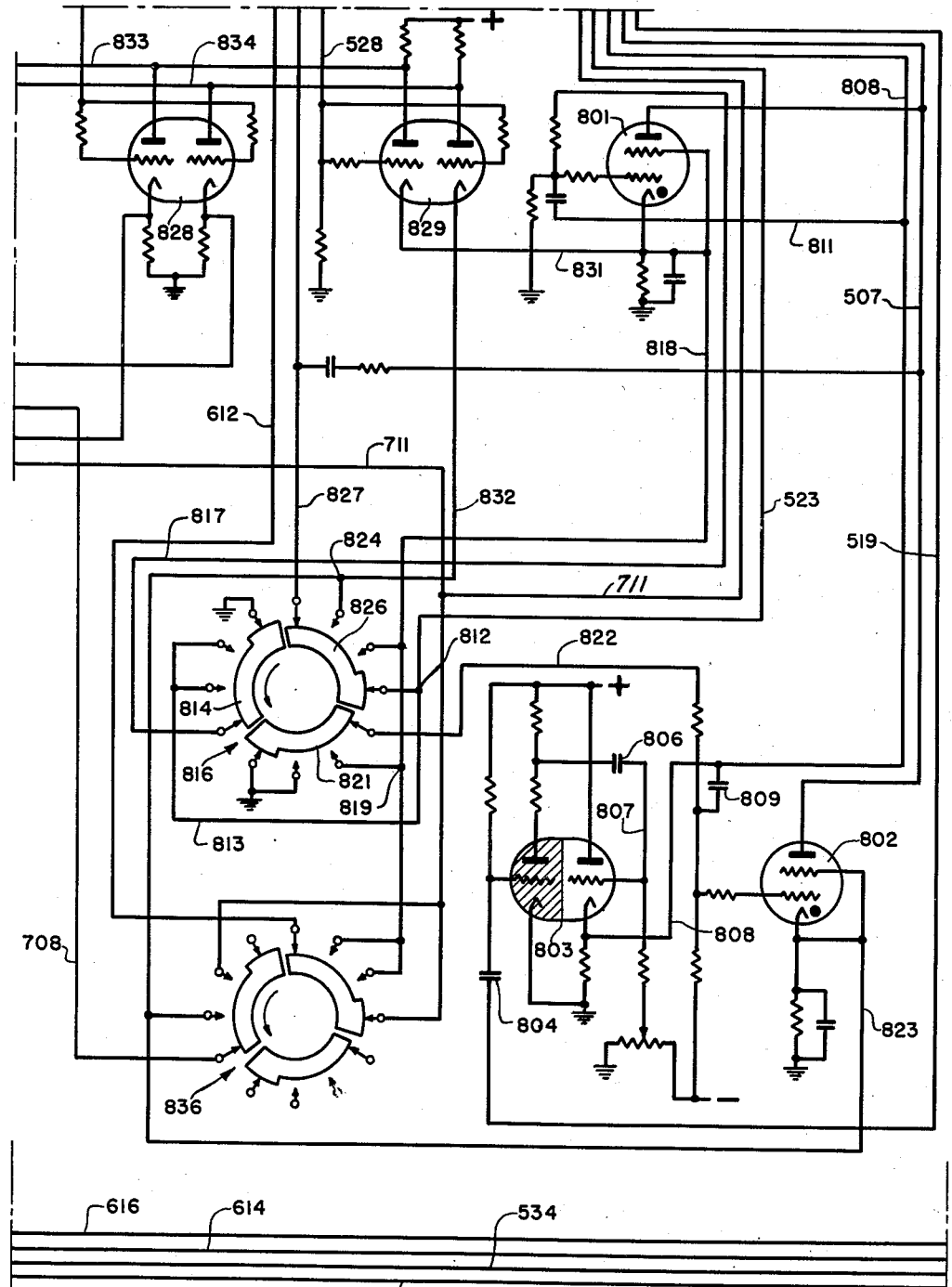

By reference to Fig. 5 it may be seen that the right-hand portion of the twin triode 527 will also be conducting normally from positive potential being applied over the conductor 528 to the grid thereof. However, at such time as B channel distributor tube 511 is conducting, positive potential will be applied from its cathode circuit to a conductor 529 which is connected to the cathode of the right-hand portion of the twin triode 527. Thus, at this time the right-hand portion of the tube 527 will become nonconducting. Under the above condition the left-hand portion of the tube 527 will no longer be nonconducting but instead will be conducting as at such time as tube 511 became conducting it extinguished the tube 509, and, therefore, precluded further potential from being applied to the conductors 514 and 526 to block operation of the left-hand portion of the tube 527.

A twin triode 829 is provided, both portions of which are normally conducting due to positive potential being impressed over the conductor 528 to the grids thereof. During the interval that the C channel distributor tube 801 is conducting, potential will be impressed from its cathode circuit over a conductor 831 to the cathode of the left-hand portion of the tube 829, causing it to be rendered nonconducting. Likewise, at such time as the tube 802 is conducting potential will be impressed in its output circuit and over a conductor 823 to junction point 824 and thence over a conductor 832 to the cathode of the righ portion of the twin triode 829. Under this condition the right portion of the tube will become nonconducting because of blocking potential on its cathode.

From the above it may be seen that only one of the portions of the tubes 527 and 829 will be nonconducting at any one time, the remaining three portions of the tubes all being conducting at that time. Further, the portion of the tube which will be nonconducting is dependent on which of the channel distributor tubes is conducting. The interval of time that the portion of the tubes 527 and 829 will be nonconducting depends therefore upon the period of time which the associated channel distributor tube is conducting and which is for a duration of one complete cycle of operation of the impulse distributor occurring once for each four channel multiplex cycle.

It will be noted that a neon indicator light 531 is inserted in circuit with the output of the channel distributor tube 509, its circuit extending from the junction point 516 of the conductor 514. The neon light 531 is operated or illuminated once for each time the channel distributor tube 509 is conducting and therefore indicates each time that the channel distributor has completed a cycle.

It was previously mentioned that the anode and grid of the left portion of the twin triode 527 was connected to a source of positive battery. A conductor 532 is connected intermediate the anode and the source of battery and extends to the anodes of the left-hand portion of the matrix tubes 313, 314, 411, 412, 413, and 524, all of which are associated with the A channel. From this it may be understood that at such time as the left-hand portion of the tube 527 is conducting, which will be for all periods except when the A channel distributor tube 509 is conducting, a very low positive potential will be supplied to the anodes of the left portion of the matrix tubes described above and associated with the A channel. Under this condition even though potential be applied to those tubes from the impulse distributor and signal impulses, the tubes will not be operative because of lack of sufficient anode potential. However, at such time as the A channel distributor tube 509 is conducting, which interval is assigned for transmission of five impulses indicative of a character for the A channel of transmission, blocking potential will be supplied to the cathode of the left-hand portion of the tube 527 over the conductors 514 and 526, all as described above, resulting in that portion of the tube being nonconducting. Under such occurrence the operating anode potential will be supplied to the conductor 532 through a common anode load resistor 536, thereby allowing any of the matrix tubes, described previously as being associated with the A channel, to operate in accordance with conditions as will be described hereinafter.

The anode of the right-hand portion of the tube 527 also has a connecting common conductor 533 which is likewise intermediate the anode and the source of potential and which connects with the anodes of the right-hand portions of the matrix tubes 313, 314, 411, 412, 413, and 524, all assigned to the B channel. Thus, under a similar condition to that described above but with the B channel distributor tube 511 conducting, the right portion of the tube 527 will be nonconducting and operating anode potential will be supplied to the anodes of the B channel matrix tubes over the conductor 533. During this interval of time impulses indicative of a character of the B channel may be transmitted. During the intervals when the distributor tube 511 is not conducting, during which time the right-hand portion of the tube 527 is conducting, the anode potential will be at so low a value because of a high resistance plate load resistor 537, to preclude operation of any one of the associated B channel matrix tube sections even though they be conditioned by the impulse distributor and signal conditions.

The anode of the left-hand portion of the tube 829 is connected by a common conductor 833 to the anodes of the left-hand portion of the matrix tubes 603, 604, 701, 702, 703, and 828 which are assigned to the C channel. The operation with respect to the left-hand portion of tube 829 is similar to that described for tube 527 in that it will be nonconducting during the period of conductivity of the C channel distributor tube 801 thereby allowing high potential on the conductor 833, and will be conducting during the interval that the tube 801 is extinguished, thereby reducing the anode potential and preventing operation of any of the C channel matrix tubes, similarly to that described above. During the period of conductivity of the C channel distributor tube 801 and the corresponding nonconductivity of the left-hand portion of the tube 829, five signal impulses indicative of a character may be transmitted over the C channel.

A similar operation or function to that described above is served by the right-hand portion of the twin triode 829 which has its anode circuit connected by a common conductor 834 to the anode of the right-hand portions of the matrix tubes 603, 604, 701, 702, 703, and 828, all associated with the D channel of transmission. Thus, during the time that the D channel distributor tube 802 is conducting, the right-hand portion of the triode 829 will be blocked and positive potential will be supplied to the anodes of the D channel matrix tubes over the conductor 834. During the other periods of operation with the distributor tube 802 extinguished and the right-hand portion of the tube 829 conducting, the anode potential will be reduced and will not be sufficiently high to allow any of the D channel matrix tubes to conduct, even though conditioned by other means.

From the above description it may be seen that even though the No. 1 impulse distributor tube 300 supplies a positive impulse to the grids of the matrix tubes for all four channels, as represented by both portions of the two tubes 313 and 603, only one matrix tube associated with a single channel will be allowed to become conducting because of the fact that at any time assigned to a given channel the anodes of matrix tubes of only one channel will receive sufficiently high potential to allow them to conduct. This latter operation, as described above, is under the control of the channel distributor, the matrix tubes of one channel being conditioned at one time through the conductivity of its associated channel distributor tube. In this manner it is possible to get multiplex transmission for a plurality of channels, the present illustration indicating that a single character composed of a group of from zero to a maximum of five intelligence code impulses plus a sixth or control pulse if the six unit connection is used will be transmitted for the A channel, then for the B channel, followed by the C channel, and finally for the D channel. The above operations will occur in succession until such time as the apparatus is rendered unoperative.

Four plug connectors 606, 607, 704, and 706 have been provided which are utilized to connect with some signal source such as a tape sensing transmitter of the well known type or of the start-stop to multiplex converter disclosed and described in copending application Serial No. 54,775 filed on October 15, 1948, in the name of R. D. Slayton. The plug 606 would be connected to a signal initiating means which would be for the A channel, the plug 607 for the B channel, the plug 704 for the C channel, and the plug 706 for the D channel.

The plug 606 is provided with five conductors 608, which are connected to the A channel matrix tubes, the first and fifth being coupled to the grids of the left-hand portions of the tubes 313, and 413, the remaining three connections being to the respective cathodes of the left-hand portions of the tubes 314, 411, and 412. It is on these conductors that the individual signal conditions will originate from the contacts of a tape sensing device, for instance, or the storage device of a start-stop to multiplex converter. The connections which are divided to the grids and cathodes of the matrix tubes have been made arbitrarily in order to provide a signal pattern for a purpose which will appear during the description of the receiver. The fact, however, that such connections have been made will not result in an improper reception of signals at the receiver as compensation has been made thereat for such a scheme of connection, also as will appear during the description of the receiver.

From the above description it may be understood that the A channel matrix tubes will not all operate similarly. The left-hand portions of the tubes 313 and 413 have the conductors 608 connected to their grids, whereas the tubes 314, 411 and 412 have such connections to their cathodes. With respect to the two first-mentioned tubes, in order for them to be rendered conducting, assuming the tube 509 to be conducting and anode potential to be present, there must be a condition when potential from both the signal source and the distributor tube 308 is impressed simultaneously on the grid; potential from one source only is not sufficient. With respect to the latter-mentioned tubes, and assuming anode potential present, the potential impressed on the grids from the associated distributor tubes, such as 309, is sufficient to cause the tubes to be rendered conducting, provided that no blocking potential is impressed to their cathodes over the conductors 608. The differences in operating potential required by the various tubes is provided for by different circuit constants.

A sixth connection post is provided on the plug 606 which is connected by means of a conductor 609 to the cathode of the right-hand portion of the tube 527, through a condenser 533. Keeping in mind that during the prior description of the circuit it was mentioned that during the period of transmission of an A channel signal, the A channel distributor tube 509 was conducting. It was also mentioned that at the conclusion of transmission of the impulses indicative of the character for the A channel the B channel distributor tube 511 would be rendered conducting, and the A channel distributor tube 509 would be extinguished. At such time as the B channel distributor tube 511 is rendered conducting potential is impressed as was described previously over conductor 529 to the cathode of the right-hand portion of the triode 527. This potential will also be impressed through the condenser 535 in the form of an operating impulse and thence over the conductor 609 to the plug 606. Such potential will be impressed on the signal initiating means to allow the formation of a succeeding character which is to be transmitted the next time that an A channel character is due for transmission. Such impulse may be utilized to cause a tape transmitter to step the tape to the next transverse row of perforations or may be utilized to cause the code converter in the above-mentioned Slayton patent application to operate to set up a new character as is described in detail in that application.

Figure 10:
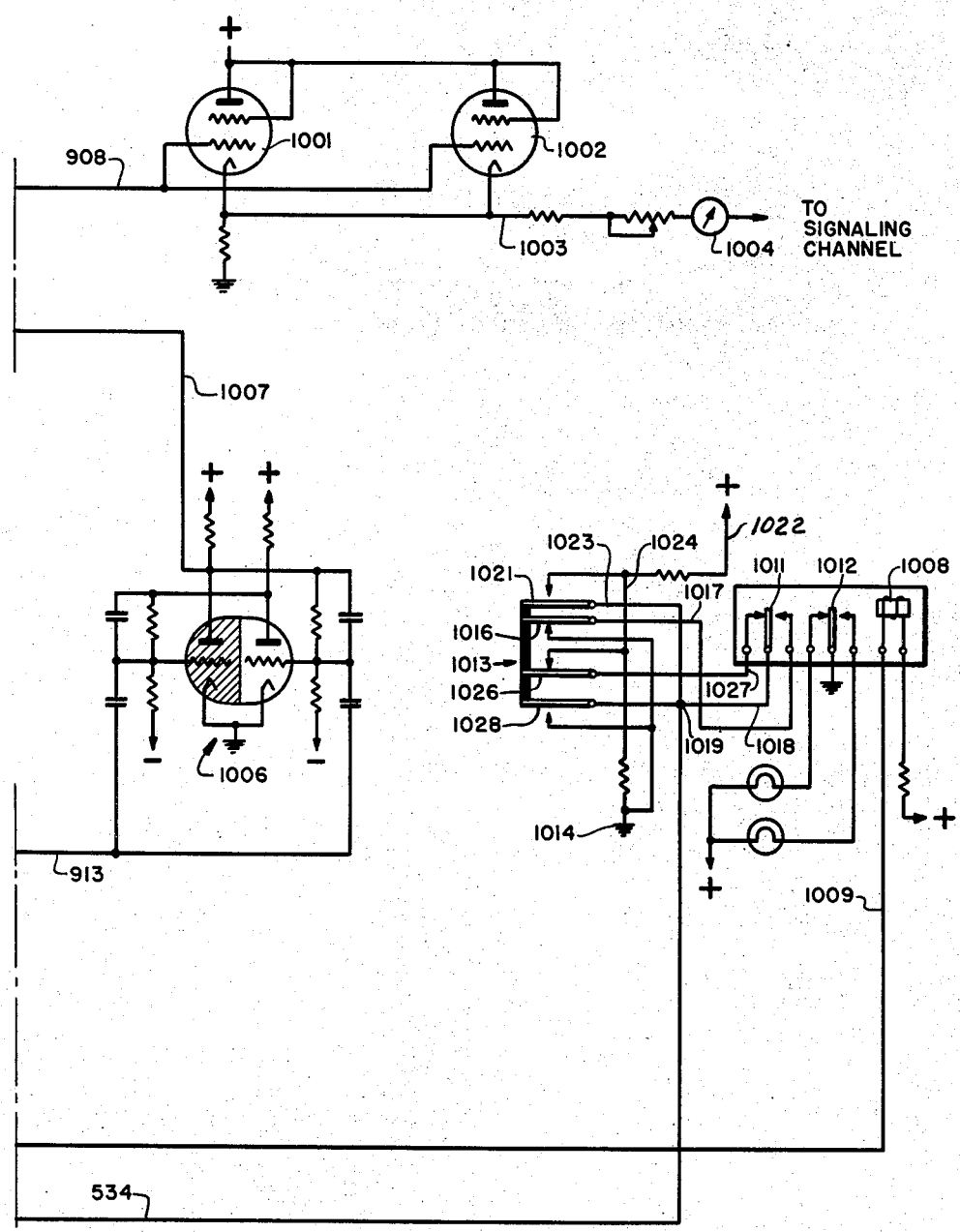

The left-hand portion of the sixth matrix tube 524 has its grid connected by means of a conductor 534 to the circuit continuity circuit illustrated in Fig. 10. The use of such a connection will be described in detail later during the description of the circuit continuity system.

The plug 607 is connected by means of six conductors 611 to the grids of the right-hand portions of the B channel matrix tubes 313, 314, 411, 412, 413, and 524. Thus, the signals which originate externally in a signal source such as the tape transmitter or extensor will be impressed over the individual conductors 611 to the six matrix tubes indicative of a six unit code. If a five unit code only is being transmitted the connection will remain to the No. 6 tube but a blank condition will exist during the time of transmission of the sixth impulse. As was described above with respect to the A channel, at such time as the B channel distributor tube 511 is conducting, with the associated B channel matrix tubes ready for operation with potential on the common conductor 533, the matrix tubes will be operated by the impulse distributor in accordance with the signal conditions on the conductors 611. A seventh conductor 612 is connected to the plug 607 and also in the output circuit of the C channel distributor tube 801 through a switch 836. Thus, after the transmission of a character from the B channel and as the distributor tube 801 is rendered conducting, an impulse will be impressed on the conductor 612 for causing a new signal selection to be set up in the signal originating means connected to the plug 607.

The plug 704 is connected by means of six conductors 707 to the cathodes of the C channel left-hand matrix tubes 603, 604, 701, 702, 703, and 828. By means of such connections at such times as the matrix tubes are ready for operation to transmit a C channel character, through the conductivity of the C channel distributor tube 801 and the blocking of the left-hand portion of the tube 829, signal conditions will appear in the matrix tubes in accordance with the conditions of the conductors 707. A seventh conductor 708 is also connected to the plug 704, its opposite terminal being connected through the switch 836 to the output circuit of the D channel distributor tube 802. Thus, similarly as was described above, after the C channel signal has been transmitted and the D channel distributor tube 802 been rendered conducting, an impulse will be applied to the conductor 708 to cause the formation of a new character selection in the signal initiating means connected to the plug 704.

The plug 706 also has six conductor connections 709 to the cathodes of the D channel right-hand portion of matrix tubes 603, 604, 701, 702, 703, and 828, to permit transmission of a D channel signal during the interval that the D channel distributor tube 802 is conducting and in accordance with the signal existing on the conductors 709. A seventh conductor 711 is connected in the output circuit of the A channel distributor tube 509 over the conductors 526 and 514 so that after the D channel signal has been transmitted and upon conditioning for transmission of an A channel signal, an impulse will be impressed as the A channel distributor tube is rendered conducting, over the conductors 514, 526 and 711 to the plug 706, and thence to the signal initiating means connected thereto to allow selection of the succeeding character which is to be transmitted.

As has been described previously a portion of the conductors 608, connecting the A channel signal initiating means to the A channel matrix tubes, are connected to the grids of the matrix tubes whereas the remaining conductors 608 are connected to the cathodes thereof. The conductors 611 which impress signal conditions from the B channel signal originating means are connected to the grids of the B channel matrix tubes. The conductors 707 and 709 connecting the C and D channel signal originating means, respectively, with the C and D channel matrix tubes are connected to the cathodes thereof. As was mentioned with respect to the A channel description, such varied connections will have no effect on the recordation of signals as the receiving apparatus compensates for such connections. These varied connections have been made, however, for a special reason which will become obvious during the description of the receiving apparatus.

The four matrix common anode conductors 532, 533, 833 and 834 all converge on a common input circuit 322 through coupling resistors 323, 324, 325 and 326 to the biased grid of an amplifier tube 330. Since only one of the anode conductors may be active at a time the variations in signaling potential are impressed on the control grid of the amplifier tube 330 to permit transmission of only the conditioned channel. This procedure is repeated in succession for each channel in order. A bias potentiometer 331 is included for adjustment to optimum operating margins.

Upon the left-hand portion of the tube 330 becoming nonconducting its anode potential will rise causing a similar rise in the potential of a conductor 327 connected to it and to the normally negatively biased grid of the right-hand portion of the tube 330. As the anode of the right-hand portion of tube 330 is connected to a source of positive battery such portion of the tube will be rendered conducting.

The anode of the left-hand portion of the tube 330 is also coupled by means of a conductor 328 to the normally negatively biased grid of the left-hand portion of a vacuum amplifying tube 613. Thus, at the time that the left-hand portion of the tube 330 is not conducting, a potential rise will occur on the conductor 328 thereby allowing the left-hand portion of the tube 613 to be rendered conducting.

The anode of the right-hand portion of the tube 330 is connected by means of a conductor 329 to the normally negatively biased grid of the right-hand portion of the amplifier tube 613. The right-hand portion of the tube 613 is normally conducting inasmuch, as previously described, the right-hand portion of the tube 330 was normally nonconducting so that the anode potential impressed on the conductor 329 is sufficiently high to offset the negative bias on the grid of the right-hand portion of the tube 613 and thereby allow it to conduct. However, as described above, the right-hand portion of the tube 330 was rendered conducting and therefore its anode potential will decrease sufficiently with a corresponding decrease of potential on the conductor 329 to cause the right-hand portion of the tube 613 to be rendered nonconducting.

The output cathode circuit of the left-hand portion of the tube 613 is connected by means of a conductor 614 to one spring clip associated with a contact rotor 901 of a selector switch indicated generally by the numeral 902. The output cathode circuit of the right-hand portion of the tube 613 is connected by means of a conductor 616 to a second spring clip associated with the contact rotor 901 of the selector switch 902. Thus, depending on the setting of the selector switch 902, the signal impulses will be relayed from one or the other portions of the amplifier tube 613, over the conductors 614 or 616 to the contact rotor 901. Inasmuch as the tube 330 and the amplifier tube 613 will operate in opposition to each other, that is, if the right-hand portion of the tube 330 is conducting, the right-hand portion of the tube 613 will be nonconducting, a setting of the selector switch 902 to one or the other spring clips will simply result in a reversal of signal conditions. In amplification of such statement it will be understood that a marking condition existing on the tape may be transmitted as a spacing condition and vice versa. However, no improper signals will be received under such scheme of transmission as it will be previously determined as to the setting of the selector switches at the receiver and transmitter controlling such operation.

The contact rotor 901 of the selector switch 902 is connected through a permanent contact and over a conductor 903 to the normally negatively biased grid of the left-hand portion of a signal input vacuum amplifier tube 904. Thus, the left-hand portion of the tube 904 will follow the signal impulses being rendered conducting or allowed to remain in its normal nonconducting condition in accordance with marking and spacing signal impulses and the scheme of transmission thereof through the setting of the selector switch 902. The right-hand portion of the amplifier 904 is in a normal conducting state, its grid which is normally biased negatively being connected by a conductor 906 in the anode circuit of the left-hand portion thereof. Therefore, even though the grid is biased negatively the fact that the left-hand portion of the tube is not conducting will permit a sufficiently high potential to exist on the conductor 906 to offset the negative bias and cause conduction. However, at such time as the left-hand portion of the tube 904 is rendered conducting, in accordance with the signal condition on the conductor 903, the potential will drop on the conductor 906, thereby rendering the right-hand portion of the tube 904 nonconducting.

As the right-hand portion of the tube 904 is rendered nonconducting its anode circuit will be increased in potential from the source of positive battery to which it is connected through a potentiometer 907, thereby resulting in a rise of potential on a conductor 908 which is connected from the anode circuit to the grids of a pair of output vacuum amplifier tubes 1001 and 1002. The anodes of the tubes 1001 and 1002 are connected to a source of positive battery so that upon the control grids thereof receiving a potential increase the tubes will be rendered conducting. Upon the tubes being rendered conducting potential will be impressed to their cathode circuits and thence over a common conductor 1003 and through a signal meter 1004 for transmission over a signaling channel to the remotely located receiving station. The conductor 1003 may be connected to a land line or may be connected to appropriate signal originating apparatus for transmission over radio channels. In this manner the signal impulses originating from the signal originating mechanism connected to the plugs 606, 607, 704, and 706, and which were received in the matrix tubes to allow proper timing and generation will be transmitted over a signaling channel to a distant receiver.

It might be noted that the selector switch 902 has a second contact rotor 909 which is connected over obvious circuits and through signal lights indicated by the numeral 911 to a source of positive battery of a sufficient voltage to operate such lights. The purpose of the rotor 909 and the lights 911 is to indicate the setting of the selector switch 902 with respect to the rotor 901 in order that it may be ascertained readily the scheme of transmission utilized.

Under certain operating conditions it is desirable to transmit alternating current reversals instead of the signal conditions described previously. In order that such signal reversals may be transmitted solely the negative frequency drive pulses impressed on the conductor 214 to the junction point 601 are further impressed over a conductor 617 to a junction point 912 and thence over a conductor 913 to the grids of an Eccles-Jordan flip-flop circuit formed by the twin triode indicated generally by the numeral 1006 and its connecting circuits. It is not deemed necessary to describe the method of operation of the Eccles-Jordan circuit as its interconnections and operation are well known in the art. The output from the Eccles-Jordan circuit in the form of signal reversals is impressed on a conductor 1007 to a spring clip associated with the contact rotor 901 of the selector switch 902. Thus, assuming that the rotor 901 is so positioned that it will be in engagement with the spring clip associated with the conductor 1007 the signal reversals will be relayed over the conductor 903 to the signal input amplifier 904 and thence over conductor 905 to the output amplifier formed by the tubes 1001 and 1002. Thus, in this manner alternating current signal reversals will be placed on the conductor 1003 leading to the signaling channel for transmission to the distant station.

Provision is also made in the apparatus to permit the transmission of Morse signals over the signaling channel. Such is achieved through the use of the left portion of a vacuum triode 914 whose anode and grid are normally supplied from a source of positive battery over conductors 916 and 917, respectively. A conductor 918 is connected to the anode circuit and extends to a spring clip associated with the rotor 901 of the selector switch 902. In the event that the selector switch 902 is positioned so that the spring clip of the conductor 918 is in engagement with the rotor 901 it will be possible to impress Morse signals on the conductor 903 which, as previously described, leads to the signal input amplifier 904 and thence to the output amplifier formed by the tubes 1001 and 1002. Under such a setting of the selector switch 902 the left portion of the triode 914 will be normally conducting. However, by placing a Morse key 919 in the circuit between the source of potential and the grid and closing such key to ground, the left portion of the tube will be rendered nonconducting and Morse signal conditions may thus be transmitted over the signalling channel.

Figure 11:
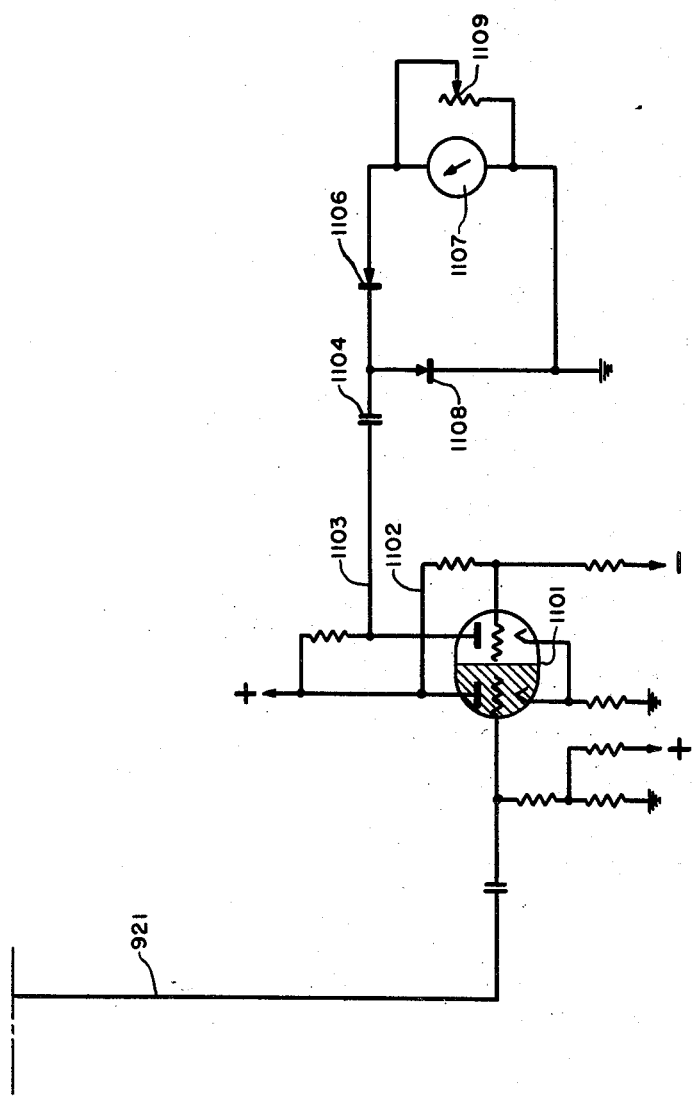
Fig. 11 illustrates a frequency meter for utilization with the apparatus.

Fig. 11 discloses a frequency meter which may be used to read directly the frequency of the negative impulses generated by the frequency drive and co-acting circuits illustrated in Figs. 1 and 2. The negative drive pulses appearing on the conductor 214 and which are impressed to junction point 601 are further impressed over a conductor 617 to a junction point 912 and thence over a conductor 921 to the normally positively biased grid of the normally conducting left-hand portion of a vacuum twin triode 1101. Upon the negative pulse being received by the grid of the left portion of the tube, such portion will become nonconducting and its anode potential will rise. At such time the potential impressed on a conductor 1102 connected in the anode circuit of the left portion of the tube will also increase, thereby overcoming normal negative bias supplied to the grid of the right portion of the tube 1101. This causes the right portion to be rendered conducting, but momentarily only, as the negative pulse impressed on the conductor 921 is of short duration and the tube 1101 will regain its original condition with the left portion conducting and the right portion not conducting. A conductor 1103 is connected in the anode circuit of the right portion of the tube 1101 on which will be impressed a square wave from the squaring amplifier exemplified by the tube 1101. The square wave output on the conductor 1103 is passed through a condenser 1104 to transpose the square wave transition points to positive and negative pulses. The positive pulses will pass through a crystal rectifier 1106 and thence through a direct current meter 1107 which reads frequency directly. The negative impulses from the condenser 1104 will not pass through the crystal rectifier 1106 because it is poled in an opposite direction but instead will pass through a crystal rectifier 1108. The passage of the negative currents through the rectifier 1108 serves to restore the condenser 1104 so that it will be in readiness to pass current upon the receipt of the next wave transition. The rectifier 1108 is poled so as not to pass positive impulses. A variable resistor 1109 is placed in shunt across the direct current meter 1107 in order to permit adjustment of the meter. As a result of the receipt of a succession of negative impulses from the frequency drive on the conductor 921, and the operation of the circuit including the condenser 1104, and rectifiers 1106 and 1108, the direct current meter 1107 will permit direct reading of the operating frequency, assuming that it has initially been calibrated properly.

It was mentioned previously that the grid of the left-hand portion of the matrix tube 524, corresponding to the No. 6 impulse position of A channel, was connected by means of a conductor 534 to a portion of the circuit continuity detector system. Because a portion only of the continuity system is disclosed in the transmitting unit that portion will be described as far as possible, with a complete description of the circuit continuity system being described with the later description of the receiving apparatus.

Figure 9:
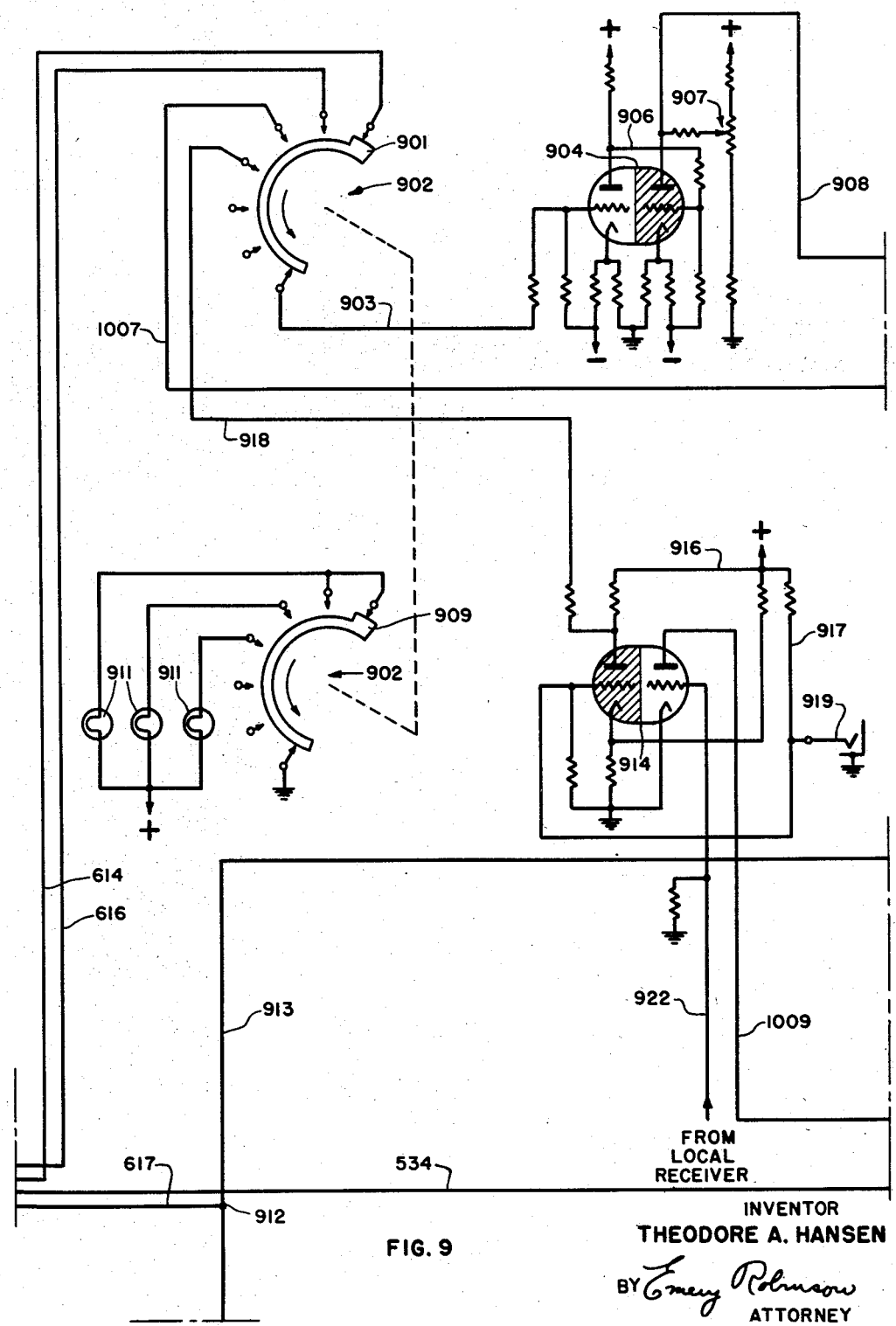
Figs. 9 and 10 illustrate apparatus essential for the transmission of signals to a signaling channel and a portion of the circuit continuity system.

As illustrated in Fig. 9, a circuit connection from the local receiving equipment, as distinguished from the receiving equipment at the remote station, is made by a conductor 922 which is normally biased negatively by the local receiver. Under this condition, with negative bias being applied to the grid of the right-hand portion of the tube 914, such portion of the tube will not conduct, and a circuit which may otherwise be traced from a positive source, through the winding of a relay 1008, over a conductor 1009, through the conducting right portion of the tube 914 to the grounded cathode will not be completed. Under this condition the relay 1008 will be de-energized and will not attract its armatures 1011 and 1012 to the right. With the relay 1008 de-energized and the manually operable switch identified generally by the numeral 1013 in its illustrated "hold" position, a circuit will be completed which may be traced from positive battery, over a conductor 1024, through the third contact point from the top of the switch 1013, through the movable swinger 1026, over a conductor 1027, through the unattracted armature 1011, over a conductor 1018 to junction point 1019 and thence over the conductor 534 to the grid network of the left-hand portion of the matrix tube 524. Under this condition and at such time as the matrix tube 524 is conditioned for operation by the channel distributor and pulsed by the impulse distributor, the tube will be inactive. Thus, at the given interval for operation of the left-hand portion of the tube 524 a signaling condition will exist on the signaling channel to the remote receiver, for a purpose to be described hereinafter. Upon the armature 1012 not being attracted, an obvious circuit will be completed for the illumination of a signal light to indicate that the relay 1008 is in its de-energized condition. It might be noted that simultaneous potentials from both the conductor 534 and the tube 501 is necessary for the left-hand portion of the tube 524 to conduct, Under certain conditions it is desirable to summon the attendant at the remotely located receiving station, such as to advise him to pay particular attention to the message about to be transmitted, or for some other reason. Under this condition the movable switch 1013 will be moved to its downward "break" position which will result in the battery being removed from the swinger 1026 and from the conductor 534. At the same time the movable swinger 1028 will engage the lowermost contact point resulting in the completion of a circuit which may be traced from ground, through the lowermost contact point and the swinger 1028, over a conductor to the junction point 1019, and thence over the conductor 534 to the grid of the left-hand portion of the tube 524. Thereafter, as the left-hand portion of the tube 524 is conditioned for operation by the channel and impulse distributors, it will be blocked and thus prevents the transmission of the sixth pulse over the signaling channel. The effect of this altered signal condition will be described during the description of the receiving apparatus inasmuch as the circuit elements which utilize the altered signal are illustrated therewith. Relay 1008 is energized at this time by means to be described later.

If after such a signal has been transmitted it is desirable to return to the initial position the key 1013 may be returned to its uppermost "make" position whereat the upper contact point will engage the movable swinger 1021 and supply battery over a conductor 1022, through the swinger 1021, over a conductor 1023 to junction point 1019, and thence over the conductor 534 to the grid of the left-hand portion of the tube 524.

It was mentioned previously that the conductor 922 extending from the local receiver was at negative potential. However, under abnormal conditions which will be described with respect to the receiving apparatus the conductor 922 may be placed at ground potential over an obvious circuit, the negative potential no longer being supplied by the receiver. At this time the right-hand portion of the tube 914 will conduct, thereby completing the circuit over conductor 1009 to the relay 1008 and thus allowing the relay 1008 to energize. The first effect of such will be the attraction of the armatures 1011 and 1012 to their rightward positions. As armature 1012 moves to its right, the initially described signal light will be extinguished and a second obvious circuit will be completed for the illumination of a second signal light which indicates the energization of the relay 1008. With the selector switch 1013 in its illustrated "hold" position at this time the movement of armature 1011 to the right will break the previously completed circuit from battery and instead will complete a circuit from ground at 1014, through the contact point and movable swinger 1016, over a conductor 1017 and right-hand contact, through the armature 1011, over the conductor 1018 to junction point 1019, and thence over the conductor 534 to the left-hand portion of the matrix tube 524. This will have the effect of the left-hand portion of the matrix tube 524 transmitting no impulse when its interval of selection occurs. If at this time the switch 1013 is in its "make" position the movement of armature 1011 will result in positive potential being supplied directly through the contact point and movable swinger 1021, ground being removed at the swinger 1016. If at this time the switch 1013 is in its lower or "break" position the circuit will be the same and ground will be supplied through the contact point and movable swinger 1016 to the grid of the left-hand portion of the matrix tube 524. With ground on the grid of the tube a condition will exist as was described initially.

In reiteration, the various combinations of the circuit continuity detector located at the transmitting station have been described but a complete description and operation thereof will be had at the time that the components of the circuit continuity detector at the receiving station are described. Once again, it should be remembered that the connections between the tube 914 by means of the conductor 922 is to be to a receiving apparatus located at the same station at which the transmitting apparatus is located, and not at a remote station.

*Operation of transmitting distributor*

After having described the transmitting distributor unit in detail it would appear desirable to briefly outline the general operation of the various elements. The electron coupled crystal controlled oscillator 102 operates in conjunction with the frequency divider 104 to produce a wave which is amplified, squared, and formed into a succession of negative drive pulses. The drive pulses are utilized to operate an impulse distributor which is of the chain ring type and is composed of a plurality of tubes equal in number to the impulses in the code being transmitted. Provision is made so that either five or six unit code may be transmitted by the illustrated embodiment. The distributor tubes operate in a predetermined order and in a succession in accordance with the negative drive impulses, one tube only conducting at any one time.

A channel distributor is also provided and is composed of a number of tubes equal to the number of channels to be transmitted over the multiplex system, the present embodiment disclosing four channels with switching facilities to allow transmission on two or three channels also. The channel distributor is of the ring type similar to the impulse distributor but is operated to cause its tubes to conduct in succession under the control of the impulse distributor rather than the drive pulses. The channel distributor operates similarly to the impulse distributor in that one tube only is conducting at any one time.

A plurality of matrix tubes are supplied for each channel there being a matrix tube triode element for each impulse position of the unit code being transmitted. The illustrated embodiment discloses six triode elements for each channel thereby providing for the transmission of a six unit code but with switching facilities to allow the transmission of five unit code only.

All of the matrix tubes assigned to the same impulse position for all channels, that is, the No. 1 impulse position for channels A, B, C, and D, will be pulsed by a common impulse distributor tube. However, operation of only one triode will be possible because of the channel distributor which through cooperation with associated control tubes allows the matrix tubes of only one channel to be conditioned for operation during the time assigned to that channel. The operation of the channel and impulse distributors being in succession, all of the impulses for a signal from one channel will be transmitted, the impulse distributor then stepping the channel distributor to provide for the transmission of all of the impulses of a character from the next channel. Such operation continues until such time as the available messages are transmitted.

The signal impulses to be transmitted by the multiplex distributor may originate from any suitable source, such as a tape sensing unit or a start-stop to multiplex code converter, and are impressed to control the matrix tubes corresponding to the particular impulse position and channel of the various signal impulses. The illustrated example provides that such impulses may be impressed on either the grids or cathodes of the matrix tubes depending on a predetermined signal pattern. No signals will be improperly received because of such scheme of transmission inasmuch as the receiving device will be operated in accordance with a similar signal pattern.

Means in the form of a multiplex operating pulse is provided for each signal originating unit so that the next impulse may be set up for impression to the matrix tubes. More specifically, such multiplex operating pulse originates upon the stepping of the channel distributor in such a manner as when the B channel distributor tube is rendered conducting an operating pulse is originated for the A channel signal originating means, the A channel signal already having been transmitted at this time. Similarly, multiplex operating pulses are provided for B, C, and D channels in a similar manner to that described above.

The operation of the matrix tubes under the joint control of the impulse distributor, channel distributor, and signal originating devices results in signals being originated which are amplified and transmitted over a signaling channel to a remotely located receiver.

The multiplex equipment is provided with certain other facilities such as means to transmit alternating current reversals over the signaling channel, Morse signals over the same signaling channel, and the regular intelligence signals all depending on the manual setting of a control switch. A frequency meter is also provided in such a circuit as to allow a direct reading of the frequency of the drive pulses.

A circuit continuity detector system is also provided which is utilized in combination with the local receiving distributor to apprise an operator of loss of transmission circuit or an out of phase condition. It is also possible through manual operation of the circuit continuity system components to summon an operator at the remotely located receiving station.

While the above transmitting distributor and its operation have been described in terms of five or six unit code transmission and two, three, or four channels of transmission, it becomes readily apparent from a description of the components of the transmitter that the channel speed may be increased or decreased and the number of channels increased under the theory of operation of the apparatus. Such may be readily done by the increase in the number of channel distributor and matrix tubes and substitution of a drive unit of correct frequency. Likewise, other modifications and additions may be readily made to the disclosed electronic multiplex transmitter distributor.

Receiver drive

The receiving distributor is provided with a temperature controlled crystal unit indicated generally by the numeral 1201 which is connected to an electron coupled oscillator indicated generally by the numeral 1202. It is not deemed necessary to describe in detail the function or operation of the crystal unit 1201 and the electron coupled oscillator 1202 as they are both well known in the art, either individually or in operative conjunction with each other.

The output of the electron coupled oscillator is impressed on the first stage of a plural stage frequency divider indicated generally by the numeral 1203. No description of the frequency divider will be given inasmuch as the same is illustrated and described in the patent to Norrman, referred to with respect to the transmitter drive. The output of the frequency divider in the form of a distorted wave is impressed on a conductor 1204 from one stage of the frequency divider and upon a conductor 1206 from a second stage of the frequency divider. The reason for tapping the frequency divider at two points to derive two different output frequencies will become more obvious during the following description of the apparatus.

The conductor 1204 is connected to one spring clip of a contact rotor 1401 forming a portion of a manually operable selector switch indicated generally by the numeral 1402. The circuit may be further traced from rotor 1401 over a conductor 1403 to the grid of the left-hand portion of an amplifier tube 1404. The left portion of the tube 1404 will conduct in accordance with the input, alternately being conducting and nonconducting. During the periods that the left-hand portion of the tube 1404 is nonconducting, its anode potential will rise due to the connection to the source of positive battery with a corresponding rise in potential to the conductor 1406 connected in the anode circuit. A circuit may be further traced to a junction point 1407 and thence through a coupling network indicated generally by the numeral 1408 to the normally negatively biased grid of the left portion of a squaring amplifier tube 1409. The coupling network 1408 is adjustable in order to shift the triggering point along the input wave to the grid of the left portion of the drive-pulse squaring amplifier 1409, to properly position the output drive pulse.

During the intervals that the left portion of the tube 1409 is conducting a potential drop will occur in its anode circuit and correspondingly on a conductor 1411 connected in its anode circuit. The conductor 1411 is connected to the normally negatively biased grid of the right-hand portion of the squaring amplifier tube 1409. Thus, during the interval that the left-hand portion of the tube 1409 is conducting the negative bias will prevail on the grid of the right-hand portion of that tube thereby rendering that portion nonconducting. During the alternate intervals, that is, when the left-hand portion of the tube 1409 is conconducting the potential in the anode circuit and on conductor 1411 will rise thereby allowing the right-hand portion of the tube 1409 to become conducting. The two conditions described will occur alternately thereby allowing a square wave output to be derived in the anode circuit, which is positively biased, over conductors 1412 and 1413.

The conductor 1412 forms a portion of a circuit which may be traced to a spring clip associated with a contact rotor 1414 of the selector switch 1402. The selector switch 1402 is illustrated in a position for two channel operation but assuming that four channel operation is desired, the spring clip associated with the conductor 1412 will be in engagement with the rotor 1414, thereby completing a circuit through the rotor 1414 and over a conductor 1416 and through a differentiating condenser 1417 to the normally negatively biased grid of the right-hand portion of the tube 1404. Thus, during the intervals that the right-hand portion of the tube 1409 is not conducting, with the subsequent rise in potential on the conductor 1412, such positive potential will be impressed on the conductor 1416 and through the condenser 1417 to the grid of the right-hand portion of the tube 1404 thereby causing that portion of the tube to conduct. As the anode of the right-hand portion of the tube 1404 is grounded through a load resistor, at such time as that portion of the tube conducts negative potential will be applied over conductor 1418 from the negative battery source to which it is connected to the cathode of the tube. Because the grid is positive the tube will conduct during these intervals, and supply sharp negative impulses to the conductor 1419 connected therewith. Because of the condenser 1417 the right-hand portion of the tube 1404 will be conducting momentarily for each time that the right-hand portion of the tube 1209 is rendered nonconducting and therefore a succession of negative pulses will be impressed on the conductor 1419 and to a junction point 1421, such pulses being spaced in accordance with the output frequency of the divider 1203.

If three channel operation is desired the selector switch 1402 will be so positioned that the spring clip associated with the conductor 1206 will be in engagement with the rotor 1401. Under this condition the conductor 1204 will be disengaged from the rotor 1401 and the appropriate frequency will be applied over the conductor 1403 and through the various previously described circuits to obtain negative pulses of a different frequency from the right-hand portion of the tube 1404 to the conductor 1419.

If two channel operation is desired, the selector switch 1402 will be positioned as is illustrated in the drawings. Under this condition the distorted wave output from the divider 1203 will be impressed over the conductor 1204 to the rotor 1401 and thence over the conductor 1403 to operate the left-hand portion of the tube 1404. This portion of the tube 1404 will conduct as described previously to control the left-hand portion of the tube 1409. The right-hand portion of the tube 1409 will operate as described previously to impress square waves on the conductors 1412 and 1413. However, at this time the spring clip associated with the conductor 1412 will no longer be in engagement with the rotor 1414 and, therefore, will not connect electrically with the conductor 1416 for controlling the right-hand portion of the tube 1404. Instead the square waves will be impressed over the conductor 1413 to a contact rotor 1422 and thence over a conductor 1423 to supply operating potential to an Eccles-Jordan flip-flop circuit operating as a two to one ratio divider, identified generally by the numeral 1424. It is not deemed necessary to describe in detail the inter-connecting circuits or operation of the Eccles-Jordan circuit as the same is well known in the art. The output of the Eccles-Jordan circuit is impressed on a conductor 1426 to the rotor 1414 and thence over the conductor 1416 to operate the right-hand portion of the tube 1404. In this manner negative frequency pulses will be impressed on the conductor 1419 at one-half the four-channel drive frequency for the operation of the system with two channels of transmission only.

*Receiver multiplex distributor*

The negative drive pulses described previously as being impressed on the junction point 1421 are impressed further over a conductor 1427 and through a condenser 1701 to the grid of the left-hand portion of a pulse amplifier vacuum tube 1702. The grid of this portion of the tube is normally biased positively over a conductor 1703 from a source of positive battery in which the anode circuit is also connected, with the result that such portion of the tube is normally conducting. However, upon the receipt of the negative pulses on the conductor 1427 and through the condenser 1701 the grid will be biased negatively and the left-hand portion of the tube 1702 will be rendered nonconducting.

As the left-hand portion of the tube 1702 ceases to conduct the potential in its anode circuit will rise with a resulting rise in potential on a conductor 1704 connected therewith. Such potential rise on the conductor 1704 will pass through a condenser 1706 to the normally negatively biased grid of the right-hand portion of amplifier tube 1702, causing this portion of the tube to be rendered conducting.

As the right-hand portion of the tube 1702 conducts momentarily positive potential will be passed through the tube to the cathode circuit and thence over a common conductor 1707. The common conductor 1707 is connected by branching conductors such as 1708 having condensers therein such as 1709 to the control grids of a plurality of gas filled tubes 1711, 1712, 1801, 1802, 1803, and 1901, of the Thyratron type. The impulses directed to the control grids of such tubes from the conductor 1707 is not sufficient in itself to cause these tubes to conduct, it being necessary that a conditioning potential first be applied to the control grid thereof, as will be described hereinafter.

The left-hand portion of a distributor start tube 1902 is normally conducting in a circuit which may be traced from a source of positive battery, over a conductor 1903, through a common anode resistor, indicated generally by the numeral 1904, over a common conductor 1906, and through a suitable resistor to the grid thereof. Under this condition the positive source of potential which is supplied to the anode circuit of the tube while conducting will be supplied to the cathode circuit, over a common conductor 1907 to a junction point 1804, and thence over a conductor 1806 to the control grid network of the gas tube 1711. With such a conditioning voltage on the control grid, from the left-hand portion of the tube 1902, which occurs immediately upon the apparatus being put into operation, the first impulse from the right-hand portion of the tube 1702 to the common conductor 1707 will result in added potential to the control grid of the tube 1711 which with the conditioning potential thereon will allow the tube 1711 to be rendered conducting. The various tubes 1711, 1712, 1801, 1802, 1803, and 1901 have the inherent characteristic that once they are rendered conducting by a sufficient potential to the control grid thereof they will remain conducting irrespective of the grid bias until such time as a change occurs in their anode or cathode circuit.

It should be noted that the anodes of the various gas filled tubes such as 1711 are connected over the common conductor 1906, through the common anode resistor 1904, and over the conductor 1903 to the same source of positive battery that is utilized to maintain the left-hand portion of the tube 1902 in a state of conduction. Such being the case and because of the use of the common anode resistor at such time as the tube 1711 is rendered conducting a sufficient potential drop will occur on the grid of the left-hand portion of the tube 1902 to render it nonconducting.

During the period of conduction of the tube 1711 potential will be applied to its cathode circuit and thence over a conductor 1713 to the control grid of the succeeding tube 1712. This potential is not sufficient in itself to render the tube 1712 conducting, but instead supplies the conditioning potential for the control grid of the tube 1712, similarly as was done by the left-hand portion of the tube 1902 for the tube 1711.

Upon the receipt of the next positive impulse on the common conductor 1707 indicative of conduction in the right-hand portion of the tube 1902, and initiated by a negative pulse on the conductor 1427, operating potential will be supplied to all of the branching conductors such as 1708 connected to the grids of the various tubes under discussion. However, at this time the control grid of the tube 1712 will be the only grid which will be supplied with conditioning potential and therefore tube 1712 will be the only one which will be rendered conducting.

Upon the tube 1712 being rendered conducting and because its anode is connected in the same circuit with the anode of the tube 1711 by means of the common conductor 1906 to the common anode resistor 1904, the tube 1711 will be extinguished at the time that tube 1712 is rendered conducting. It might be noted that the cathodes of the various tubes such as 1711 are connected through a resistor to ground, said resistor having a condenser connected in shunt relationship thereto. The purpose of such cathode circuits and and their relationship to the common anode resistor and its means of operation may be understood in detail by reference to the previously mentioned Wilkerson patent.

A condenser 1705 is provided to give a marker or identification impulse to a monitoring point 1710 for the purpose of quickly locating a defective distributor tube. With reference to the voltage pulse pattern appearing at the point 1710, it may be understood that the No. 1 distributor tube anode potential pulse will have twice the negative amplitude as the succeeding Nos. 2, 3, 4 and 5 distributor tube anode potential pulses, and that the No. 6 distributor tube anode potential pulse has been cancelled. This effect is produced by the feedback of the No. 6 pulse over the conductor 1806 through the differentiating condenser 1705, which differentiated pulses add to and detract from the anode extinction pulses to give the identification pattern illustrated. An oscilloscope is connected to the point 1710 for viewing this pattern.

Each of the succeeding tube pairs such as 1801 and 1712, 1802 and 1801, 1803 and 1802, and 1901 and 1803 have interconnecting conductors such as 1713 between the control grid of the succeeding tube and the cathode circuit of the preceding tube for supplying conditioning potential in a manner as was described above. With respect to the conductor joining the tubes 1901 and 1803 it may be noted that it is in circuit with a manually operable switch 1807. When the switch 1807 is in the illustrated position the tubes are connected but at such time as the switch is placed in its vertical position the control grid of the tube 1901 will be grounded, such switch being provided in order that reception of either five or six unit code may be possible, as will appear hereinafter.

The output circuit of the tube 1803 includes a conductor 1808 which connects with one contact point of a manually operable switch 1809. The opposite contact of such switch is connected over a conductor 1811 to the output circuit of the tube 1901. Depending on the position of the switch 1809, potential will be applied from the output circuit of the tube 1803 over the conductor 1808 or the output circuit of the tube 1901 over the conductor 1811, through the switch 1809 to the junction point 1804, and thence over a conductor 1806 to the control grid of the tube 1711. The switch 1809 is provided so that if five unit code is to be received it will bridge with the conductor 1808 and if six unit code is to be received it will bridge with the conductor 1811, as illustrated. In either event the potential will serve as conditioning potential for the control grid of the tube 1711, the left-hand portion of the tube 1902 now being nonconductive, and will permit ring operation of the gas tubes.

From the above description it may be seen that the tubes 1711, 1712, 1801, 1802, 1803, and 1901, will each operate for a predetermined interval, in succession, only one of the tubes being conducting at any one time. Also the ring formed by the tubes will be stepped with successive tubes being rendered conducting at time intervals equal to the reciprocal of the output frequency of the divider 1203. The various just-described tubes form an impulse distributor.

The right-hand portion of the tube 1902 is also normally conducting, positive potential being supplied from a source of positive battery, through a common anode resistor, indicated generally by the numeral 1908, and through a resistor to the grid thereof, such potential being sufficient to overcome the normal negative bias on the grid. During the time the right-hand portion of the tube 1902 conducts, positive potential will be impressed from its cathode over a conductor 1909 to a junction point 1911, over a conductor 1912 to a junction point 1913, and thence over a conductor 1914 and through suitable resistors to the control grid of a gas filled tube 1916 which is of the Thyratron type and similar to the impulse distributor tubes described above. The output potential so applied to the control grid of the gas tube 1916 when taken with the negative bias normally supplied to such grid is not sufficient to cause conduction of the tube 1916 but instead acts as a conditioning potential only. As was described previously, at such time as the tube 1803 was conducting, potential was applied to the conductor 1808 and to one contact of the movable switch 1809, or as the tube 1901 was conducting positive potential was applied to the conductor 1811 and to the second contact point of the switch 1809, such circuit being completed through the switch to a junction point 1804, depending on whether five unit or six unit code were to be received. The potential applied to the junction point 1804 will be impressed over a conductor 1812 and through a condenser 2201 to the normally negatively biased grid of the right-hand portion of a delay tube 2202. Such positive impulse on the grid will cause that portion of the tube to be rendered conducting, resulting in a drop of potential in its anode circuit and to a conductor 2203 connected thereto. A condenser 2204 is placed in the conductor 2203 intermediate the anode circuit of the right-hand portion of the tube 2202 and the normally positively biased grid of the normally conducting left-hand portion of the tube 2202. Under this condition the left-hand portion of the tube 2202 will be rendered nonconducting for a period of time necessary for the negative charge in the condenser 2204 to leak off. At the time that the left-hand portion of the tube 2202 is not conducting a potential rise will occur in its anode circuit and to the conductor 2206 connected therewith. The conductor 2206 is also connected through a condenser 2207 to the normally positively biased grid of the normally conducting left-hand portion of a vacuum triode 2208. The positive impulse passing through the condenser 2207 to the grid, as described, will have no effect as the left-hand portion of the tube is already conducting. However, at such time as the negative charge on the condenser 2204 leaks off and the left-hand portion of the tube 2202 once again becomes conducting, a potential drop will occur on the conductor 2206 resulting in a negative pulse passing through the condenser 2207 which is sufficient to render nonconducting the left-hand portion of the tube 2208.

As such portion of the tube 2208 becomes nonconducting, its anode potential will rise with a resulting rise in potential to the conductor 2209 connected thereto. A condenser 2211 links the conductor 2209 to the normally negatively biased grid of the right-hand portion of the triode 2208. Such rise in potential results in a positive impulse passing through the condenser 2211 to cause the right-hand portion of the triode 2208 to be rendered conducting.

Upon the right-hand portion of tube 2208 becoming conducting potential will be impressed on its output cathode circuit and to a junction point 2212. The potential will be further impressed from the junction point 2212 over a conductor 2213 and through a suitable condenser and resistor to the control grid of a gas filled tube 2214. Potential will also be applied from the junction point 2212 over a conductor 2216 to a junction point 2217, and thence over a conductor 2218 having a series condenser resistor combination to the control grid of a gas filled tube 2219. The potential on the conductor 2216 will be impressed past the junction point 2217 on a conductor 2221 to a junction point 1917 and thence over a conductor 1918 containing a series condenser resistor combination to the control grid of the previously mentioned tube 1916. The potential will also be impressed past junction point 1917 on a conductor 1919 having a series condenser resistor combination to the control grid of a gas filled tube 1921. As the gas tubes 2214, 2219, and 1921 have similar properties to the tube 1916, which was described as necessitating both a conditioning potential and an operating potential on the control grid thereof, the tube 1916 will be the only tube which will be rendered conducting at this time for, as previously described, it received a conditioning voltage on its control grid from the conductivity of the right-hand portion of the tube 1902.

As the right-hand portion of the tube 2208 received a single positive impulse only on the grid thereof it remains conducting momentarily only with the result that the operating impulse to the junction point 2212 is likewise of momentary duration only. However, the tubes 1921, 1916, 2219, and 2214 are all of the variety that once rendered conducting will continue to conduct irrespective of grid potential until such time as an alteration occurs in the anode cathode circuit, and thus tube 1916 will continue to conduct.

It might be noted that the positive source of battery connected through the common anode resistor 1908 for normally rendering conducting the right-hand portion of the tube 1902, is also supplied over a conductor 1922 to the anode of the tube 1921 and over a common conductor 1923 to the anodes of the tubes 1916, 2219, and 2214. Because of such circuit connections and the operation of a common anode resistor, as previously described, upon such time as the tube 1916 is rendered conducting a potential drop will occur on all interconnected circuits including the grid of the right-hand portion of the tube 1902, thereby rendering nonconducting that portion of the tube. With respect to the operation of the common anode resistor, it may be seen that the cathodes of the aforedescribed tubes are connected to ground through a resistor, such resistor being shunted by a condenser. The necessity for the same has been mentioned previously.

During the interval that the tube 1916 is conducting potential will be impressed from its cathode circuit to a conductor 1924 and thence to a junction point 2222, over a conductor 2223 to a contact rotor 2224 associated with a manually operable selector switch indicated generally by the numeral 2226. Assuming that the selector switch 2226 is in its position for four channel operation the circuit will be further established from the rotor 2224, over a conductor 2227 and through suitable resistors to the normally negatively biased control grid of the succeeding tube 2219, such potential operating as conditioning bias for the tube 2219. Thereafter, at such time as the impulse distributor tube 1803 or 1901 is rendered conducting, depending on whether five or six unit code is being received, and the subsequent operation of the tubes 2202 and 2208, described previously, the resulting operating impulse on the common conductor 2216 will cause the tube 2219 to be rendered conducting. Because of the previously described common anode resistor 1908 and its connection to the various tubes 1921, 1916, 2219, and 2214, upon the tube 2219 becoming conducting the tube 1916 will be extinguished.

During the interval that the tube 2219 is conducting potential will be impressed from its cathode output circuit to a conductor 2228 and thence to a spring clip associated with a contact rotor 2229 of the selector switch 2226. With the selector switch positioned for four channel operation the circuit will be further completed from the rotor 2229, over a conductor 2231, and through suitable resistors to the control grid of the tube 2214. This potential will operate as conditioning bias for the tube 2214 and upon the next revolution of the electronic impulse distributor and the subsequent operating impulse being supplied to the various tubes under discussion, the tube 2214 will be rendered conducting. At such time, through the use of the common anode resistor 1908, the tube 2219 will be extinguished.

During the interval that the tube 2214 is conducting potential will be impressed from its cathode circuit over a conductor 2232 to a junction point 2233, thence over a conductor 2234 to a spring clip associated with a contact rotor 2236 of the selector switch 2226. With the selector switch in a position for four channel operation the circuit will be further completed from the rotor 2236 to a conductor 2237 and thence to the control grid of the tube 1921. Upon the next operating pulse originating from the completion of a revolution of the impulse distributor, the tube 1921 will be rendered conducting. Through the use of the common anode resistor 1908 the tube 2214 will be extinguished at this time.

During the interval of conduction of the tube 1921 potential will be impressed from its output cathode circuit to the junction point 1911, over the conductor 1912 to the junction point 1913, and thence over the conductor 1914 and through suitable resistors to the control grid of the tube 1916. The next operating impulse caused by a completion of a revolution of the impulse distributor will cause the tube 1916 to be rendered conducting with the subsequent extinguishment of the tube 1921 due to the common anode resistor 1908.

From the above description it may be seen that the tubes 1921, 1916, 2219, and 2214 form an electronic ring circuit, each of the tubes remaining conducting for a predetermined interval with subsequent rendering conducting of the succeeding tube and extinguishment of the tube that was conducting. The present four tubes form a channel distributor, one tube being assigned to each of the channels of transmission. It is obvious, however, that if it were desired to receive signals composed of impulses from more than four channels the channel distributor could be expanded readily to provide for such operation.

During the interval that the tube 1921 is conducting potential will be impressed over its output cathode circuit and to the junction point 1911, as described previously. The potential is also impressed on the conductor 1912 to the junction point 1913 and thence over a common conductor 1926 and through suitable resistors to the normally negatively biased grids of the left-hand portion of vacuum matrix tubes 1714, 1716, 1813, 1814, 1816, and 1927. These tubes will not conduct due to this conditioning voltage only, as the potential will not be sufficiently high on the grids for such to occur.

During the interval that the No. 1 impulse distributor tube 1711 is conducting potential will be impressed to the conductor 1713 in its cathode output circuit, over a conductor 1717 to a junction point 1718, and thence over a conductor 1719 and through a condenser to the grid of the left-hand portion of the tube 1714. Assuming at this time that anode potential is present, under a condition which will later be described, the left-hand portion of the tube 1714 will be rendered conducting by this operating potential on its grid, the conditioning potential already being present.

During the interval that the tube 1916 is conducting its output potential will be impressed over a conductor 1928 and through suitable resistors to the grids of the right-hand portions of the matrix tubes 1714, 1716, 1813, 1814, 1816, and 1927.

During the interval that the tube 2219 is conducting its output potential will be impressed on a conductor 2238 and will be supplied as conditioning potential through suitable resistors to the normally negatively biased grids of the left-hand portion of matrix tubes 2001, 2002, 2101, 2102, 2103, and 2239.

During the interval that the tube 2214 is conducting its output potential will be impressed, as stated, over conductor 2232 to junction point 2233 and thence over a conductor 2241, and through suitable resistors to the normally negatively biased grids of the right-hand portion of the matrix tubes 2001, 2002, 2101, 2102, 2103, and 2239.

Referring back again to the condition wherein it was stated that the No. 1 impulse distributor tube 1711 was conducting and potential was supplied over conductors 1713 and 1717 to junction point 1718, and thence over the conductor 1719 to the grid of the left-hand portion of the tube 1714, it may also be seen that similar potential is supplied over a conductor 1721 to the grid of right-hand portion of the tube 1714, and also over the same conductor to the grids of both the right and left-hand portions of the tube 2001. However, as it was assumed initially that the tube 1921 was conducting, thereby supplying a conditioning potential to the grid of the left-hand portion of the tube 1714 only, of the tubes mentioned, the remaining right-hand portion of the tube 1714 and both the left-hand and right-hand portions of the tube 2001 will at this time receive no conditioning potential from their associated channel distributor tubes and therefore will be unable to be rendered conducting. If, however, at the time that the tube 1711 was conducting, the tube 1916 was conducting instead of the tube 1921, the grid of the right-hand portion of the matrix tube 1714 would be conditioned and therefore that portion of the tube would be rendered conducting, assuming anode potential to be present. The same condition exists with respect to the left and right-hand portions of the tube 2001, under control of their associated conditioning tubes 2219 and 2214, respectively.

Without tracing all of the circuits individually it may be seen that the No. 2 impulse distributor tube 1712 will provide operating potential to the grids of both portions of the matrix tubes 1716 and 2002. The No. 3 impulse distributor tube 1801 will operate similarly on the grids of both portions of the tubes 1813 and 2101, as will tube 1802 on tubes 1814 and 2102, tube 1803 on tubes 1816 and 2103, and tube 1901 on tubes 1927 and 2239.

From the above description it may be seen that during the interval that one of the channel distributor tubes supplies conditioning potential to its associated matrix tubes, the impulse distributor will supply operating potential to the matrix tubes in succession. After all of the matrix tubes for one channel has received their operating potential from the five or six impulse distributor tubes, depending on whether five or six unit code is to be received, the succeeding channel distributor tube will be operated to condition its associated matrix tubes, the conditioning potential for the preceding channel matrix tubes being removed at this time.

The supplying of anode potential to the various matrix tubes will now be described.

The signaling channel carrying the impulses from the remotely located transmitter will be connected by some suitable means to a conductor 1501 in the present apparatus. In the event that transmission is occurring over radio channels, such connection may be through suitable conversion apparatus.

The incoming multiplex signals of neutral D. C. type on the conductor 1501 pass through suitable resistors and a line current meter to an operating winding 1502 which is positioned coaxially with and enclosing a magnetically controlled vacuum diode 1503. The coil is so positioned to secure the maximum magnetic flux linkage with the anode-cathode structure. A stabilizing varistor or crystal rectifier 1504 is placed in shunt across the operating winding 1502 to limit the amplitude of keying transients to negligible values. The magnetic diode 1503 is supplied with positive potential to its anode circuit and negative potential to its cathode circuit, and is so designed that upon a spacing or no battery condition in its operating winding 1502 the diode will be conducting whereas with a marking or battery condition in the operating winding 1502, it will not be conducting.

The anode circuit of the magnetic diode 1503 is connected over a conductor 1506 to the grid of the left-hand portion of a signal amplifier vacuum tube 1507. During the interval that the diode 1503 is not conducting, due to a marking condition on the line 1501, the anode potential of the diode will rise with a similar rise in potential on the conductor 1506 and thus the left-hand portion of the tube 1507 will be rendered conducting. If, on the other hand, a spacing condition exists on the line 1501, with the diode 1503 rendered conducting, the anode potential will drop with a similar drop in potential to conductor 1506 and the left-hand portion of the tube 1507 will be nonconducting.

The anode circuit of the left-hand portion of the tube 1507 is connected by means of a conductor 1508 to the normally negatively biased grid of the right-hand portion of the tube 1507 and therefore the right-hand portion of the tube will operate in opposite relationship to the left-hand portion thereof, one side conducting when the other side is not conducting, and vice versa.

The anode circuit of the left-hand portion of tube 1507 is also connected over the conductor 1508 to the normally negatively biased grid of the left-hand portion of an amplifier tube 1509. The left-hand portion of tube 1509 will, therefore, conduct or not conduct in opposite relationship to the left-hand portion of the tube 1507 as was similarly described for the right-hand portion of the tube 1507.

The anode circuit of the right-hand portion of the tube 1507 is connected by means of a conductor 1510 to the normally negatively biased grid of the right-hand portion of the amplifier tube 1509. As a result of such connection the right-hand portion of the tube 1509 will conduct or not conduct in opposite relation to the operation of the right-hand portion of the tube 1507.

The anode circuits of both sections of the amplifier tube 1509 are connected over suitable conductors to the grids of both sections of a keyer tube 1511. Thus, the sections of the tube 1511 will conduct or not conduct in opposite relationship to their associated sections of the tube 1509.

The output circuit of the left-hand portion of the keyer tube 1511 is connected over a conductor 1512 to one contact point of a manually operable signal inversion switch, indicated generally by the numeral 1601, and assuming the switch to be in its right-hand position, over a conductor 1602, through a movable swinger 1603 of a manually operable switch indicated generally by the numeral 1604, through the lower contact associated with the swinger 1603, over a conductor 1606 to a contact point now in engagement with a movable swinger 1607, and thence over a conductor 1608 to the anodes of both portions of the tube 1714, to the anodes of right portions of the tubes 1716, 1813 and 1814, and to the anodes of both portions of the tubes 1816 and 1927.

With the switch 1601 assumed to be in its right-hand position, the output circuit of the right-hand portion of the tube 1511 will be connected over a conductor 1513, through the switch 1601, over a conductor 1609, through a movable swinger 1611 of the switch 1604, through its lowermost contact point in engagement therewith, over a conductor 1612, through a movable swinger 1613 in engagement with the contact point of conductor 1612, over a conductor 1614 to junction point 1722 and thence over a conductor 1723 to the anodes of the left-hand portions of the tubes 1716, 1813, and 1814. The connection may also be traced from junction point 1722, over a conductor 1724 to the anodes of both portions of all of the matrix tubes 2001, 2002, 2101, 2102, 2103, and 2239.

From the above description it may be seen that the incoming code signal impulses will be passed from the magnetic diode 1503, through the signal amplifiers 1507 and 1509 and thence through the keyer tube 1511 to the anodes of all of the matrix tubes. The reason that the conductors 1608 and 1614 are connected to anodes of different tubes, which will result in some cases in a marking condition on the line appearing as a spacing condition at the anode of particular matrix tubes and vice versa, is due to the fact that during the description of the transmitting unit certain of the connections from the impulse originating sources was made to the grids of certain matrix tubes and others to the cathodes of matrix tubes. During the description of the transmitting unit it was mentioned that this would not result in the reception of improper signals inasmuch as the receiving apparatus would be compensated under such a scheme of transmission. Accordingly, by the above described connections the receiving and transmitting units will operate in harmony with respect to each other. The purpose of such connections is to prevent any possibility of any channel of communication from occupying any other than that assigned to it. It would be impossible for all four channels to be displaced by one channel and still obtain intelligence on more than one channel, which abnormal condition could readily be remedied.

It may now thus be seen that depending on the condition of the conductor 1501, the magnetic diode 1503, the amplifiers 1507 and 1509, and the keyer 1511 that, at such time as any one of the matrix tubes has its grid conditioned by its channel distributor tube and receives an operating pulse thereon from its associated impulse distributor tube that it will be rendered conducting or prevented from being rendered conducting in accordance with the signal condition at its anode.

The output circuits of the A channel matrix tubes composed of the left-hand portion of the tubes 1714, 1716, 1813, 1814, and 1816 are connected over five conductors 1726 which terminate in a plug 2003, which may be connected to suitable electronic applique units for energizing apparatus such as the five magnets of a plural magnet printer or a reperforator both of which are well known in the art. Further, such plug may provide the input to a multiplex to start-stop converter, such as of the type disclosed in the copending application, Serial No. 54,776 filed on October 15, 1948, in the name of R. D. Slayton. The plug 2003 will carry information which was received on the A channel.

The B channel matrix tubes formed of the right-hand portions of the tubes 1714, 1716, 1813, 1814, 1816, and 1927 are connected by means of six conductors 1727 to a plug 2004, which may be connected to suitable electronic signal reception apparatus to energize a plural magnet printer reperforator as mentioned above.

The left-hand portion of the matrix tubes 2001, 2002, 2101, 2102, 2103, and 2239, forming the C channel reception means, are connected over six conductors 2104 to a plug 2106 which is connected to similar suitable reception apparatus.

The right-hand portion of the matrix tubes 2001, 2002, 2101, 2102, 2103, and 2239, forming the D channel reception means, are connected over six conductors 2107 to a plug 2108. The plug 2108 is connected to suitable reception means and carries D channel intelligence.

It may also be noted that the plug 2003 is provided with a connecting conductor 2005 which does not extend to any of the matrix tubes but instead is connected through a condenser to the cathode output circuit of the B channel distributor tube 1916. Therefore, as soon as the tube 1916 is rendered conducting an impulse will be passed through the condenser and over the conductor 2006. The purpose of this multiplex operating pulse is for control purposes in that as the plug 2003 is representative of the A channel, information for that channel will be received during the operation of the A channel distributor tube and through the operation of the A channel matrix tubes will have been utilized to operate suitable means in the apparatus to which the plug 2003 is connected. Thusly, as the A channel distributor tube 1921 is extinguished and the B channel tube 1916 rendered conducting, the operating pulse will be utilized to either operate a recording apparatus on the A channel or for control purposes with respect to a converter or other equipment to which the A channel may be connected.

It may be seen that the plug 2004 is connected by means of a conductor 2007 to a contact rotor 2242 of a manually operable selector switch indicated by the numeral 2243. Assuming the switch 2243 to be positioned for four channel operation the circuit may be further traced through the rotor 2242, over a conductor 2244 to a junction point 2246, and thence over the conductor 2228 to the output circuit of the C channel distributor tube 2219. In this manner after the B channel signals have been utilized a multiplex operating pulse will originate for recording such signals for releasing a convertor, or for other control purposes. It might be noted that the switches 2226 and 2243 may comprise portions of a gang switch and be operated together.

The plug 2106 connected to C channel operating apparatus has a conductor 2109 connected thereto which extends to a contact rotor 2247 of the selector switch 2243. When positioned for four channel operation the circuit may be further traced from the rotor 2247 over a conductor 2248 to a junction point 2249, and thence over the conductor 2232 to the output circuit of the D channel distributor tube 2214. Thus, a C channel multiplex operating pulse will originate upon the D channel being conditioned which is at a time after the reception and use of the C channel impulses.

The plug 2108 connected to D channel utilization apparatus has a conductor 2111 connected thereto which extends to a junction point 2251 and thence over a conductor 2252 and through a condenser to a junction point 1913 and thence over the conductor 1912 to the junction point 1911 and the output cathode circuit of the A channel distributor tube 1921. Thus, in this manner an operating pulse will be derived for suitable utilization at the D channel reception apparatus.

The signal inversion switch 1601 has been provided in the event that it is desired to reverse the signal conditions for any suitable purpose; such reversal would also have to occur similarly at the transmitting terminal.

Point selection of the signal is made by the operation of impulse distributor tubes, through matrix tube coupling differentiating condensers. The leading edge of the voltage wave appearing in any given distributor tube cathode load resistor occurs in the middle of the corresponding signal impulse, which relative position is automatically maintained by the action of the phase corrector, to be described later. Intermediate adjustment of the position of the selection pulse is by means of variable control 1408 on the tube 1409, described previously. Also, as was previously mentioned, the succeeding channel distributor tube is rendered conducting a short time interval after the time that the No. 5 or 6 impulse distributor tube is rendered conducting, depending on the unit code used, to prevent the selection function from occurring simultaneously with channel switching operation. Sufficient delay is introduced so that adequate time is given for selection of the No. 5 or No. 6 impulse, depending on the code used, and to allow the succeeding channel to be primed in readiness for the No. 1 selection. It is obvious, of course, that by the use of proper constants and adjustments, the operation of the channel distributor may be timed differently in accordance with the needs of the system.

With the switch 1604 in the position shown connections will be made over the previously described circuit for operation of the multiplex receiving apparatus. Also, in such position of the switch 1604 the upper movable swinger 1616 will control a signal light over an obvious circuit to indicate that the switch is positioned correctly for operation of the receiving distributor.

During the description of the transmitting apparatus it might be remembered that provision was made for the transmission of Morse signals over the signaling channel with the multiplex transmitter not operating at that time. Under such conditions the switch 1604 should be positioned to its upward position, opposite from that illustrated. Upon such an occurrence the swingers 1607 and 1613 will be connected to ground, thereby placing ground potential on the conductors 1608 and 1614 which connect to the anodes of the various matrix tubes. Thus, even though the matrix tubes receive conditioning and operating potentials they will be unable to conduct because their anodes will be at ground potential. As illustrated, the left-hand portion of the tube 1509 will be operating in accordance with the receipt of Morse signals, which will be impressed on the conductor 1512, through the switch 1601, over the conductor 1602 to the movable swinger 1603, through the upper contact point with which it is in engagement, and over a conductor 1617. The conductor 1617 extends to a closed switch 1615, and thence through a resistor to the normally negatively biased grid of a vacuum triode 1621. The anode circuit of the tube 1621 is connected by means of a conductor 1622 to the contact point engaged by the swinger 1618, and thence over the conductor 1619 and through a resistor to the normally positively biased grid of the left-hand portion of a twin triode 1623. The left-hand portion of the tube 1623 will operate in opposite relationship with respect to the tube 1621, for when the tube 1621 is conducting its anode potential and that of conductor 1622 will decrease, thereby causing the left-hand portion of the tube 1623 to be rendered nonconducting. The opposite conditions will exist when the tube 1621 is nonconducting, at which time the left-hand portion of the tube 1623 will be conducting.

The anode of the left-hand portion of the tube 1623 is connected to a source of positive battery whereas the cathode is connected to ground and through a resistor and condenser network to the cathode of the right-hand portion of the tube 1623. The grid of the right-hand portion of the tube 1623 is connected through a condenser and over a conductor 1624 to the output circuit of the right-hand portion of a twin triode 1207 forming a portion of one of the stages of the frequency divider 1203. Alternating current will be supplied over the conductor 1624 to the grid of the right-hand portion of the tube 1623, but such portion of the tube will only be able to conduct at such time as the left-hand portion thereof is not conducting and thus not applying blocking potential to the cathode thereof. The anode of the right-hand portion of the tube 1623 is connected to a source of positive battery through the primary of a transformer 1626, the secondary of which is connected to a loudspeaker 1627. Thus, during the receipt of Morse signals and through the operation of the tubes 1621 and 1623, such signals may be heard audibly over the loudspeaker 1627.

In the event that it is desired that the polarity of the Morse signals be reversed, the switch 1615 may be repositioned. In this event the conductor 1513 will be connected to the swinger 1611, and thence by means of a conductor 1641 to the grid of the tube 1621.

It should also be remembered that a description was given with respect to the transmitting apparatus that an alternating current reversal generator was provided for transmitting such type signals over the signaling channel. Such has been provided primarily for use over radio channels in order that adjustments may be made with respect to the radio apparatus in order to obtain correct signaling conditions. It is contemplated that during the intervals that the alternating current reversals are being transmitted that the switch 1604 will be in its upward position thereby precluding operation of the matrix tubes in the receiving distributor and instead causing operation of the loudspeaker 1627 over the circuits described for the reception of Morse signals.

It may also be noted that the negative drive pulses described previously as being impressed on the conductor 1419 from the output of the right-hand portion of the tube 1404 to the junction point 1421 will also be impressed over a conductor 1428 which is connected to a frequency meter circuit indicated generally by the block diagram 1429. The frequency meter, its circuits and its operation are contemplated to be identical with that disclosed and described in the transmitting apparatus and therefore need not be given in detail with respect to the receiving apparatus.

*Operation of receiving distributor*

After having described the receiving distributor apparatus in detail it would appear desirable to briefly outline the general operation of the various components in combination. The electron coupled crystal controlled oscillator 1202 operates in conjunction with the frequency divider 1203 to produce a wave which is amplified, squared, and formed into a succession of negative drive pulses. The drive pulses are utilized to operate an impulse distributor which is of the ring type and is composed of a plurality of gas filled tubes equal in number to the impulses in the code being transmitted. The present apparatus discloses the provisions for the reception of either five or six unit code. The impulse distributor tubes operate in predetermined order in succession in accordance with the negative drive pulses, there being one tube conducting at one time only.

A channel distributor is also provided which is composed of a number of gas filled tubes equal to the number of channels of intelligence which will be received by the multiplex system, the present embodiment disclosing four channels with switching facilities to allow reception of two or three channels also. The channel distributor is the ring type similar to the impulse distributor but is operated to cause the tubes to conduct successively under the control of the impulse distributor rather than the drive pulses. The channel distributor is similar to the impulse distributor in that only one tube conducts at any one time.

A plurality of matrix tubes are supplied for each channel, there being a matrix tube for each impulse position of the code being received. The illustrated embodiment discloses six matrix tubes for each channel thereby providing for the reception of a six unit code but with switching facilities to allow the reception of a five unit code only.

All of the matrix tubes assigned to the same impulse position of all channels, that is, the No. 1 impulse position for channels A, B, C, and D will receive an operating impulse from a common No. 1 impulse distributor tube. However, operation of only one matrix tube will be possible because the channel distributor conditions only the matrix tubes of a single channel at any one time. As the channel distributor is under the control of the impulse distributor the individual impulses of a single character for one channel will be transmitted in succession before characters are transmitted from any of the other channels. Such interleaved operation continues until no more signals are received.

The signal impulses which are received by the present unit over the signaling channel are passed through a magnetic diode, amplifiers, and a keying tube to the anodes of the various matrix tubes.

Thus, at such time as the matrix tubes are conditioned by their channel distributor and receive an operating impulse from their impulse distributor, they will conduct or not conduct in accordance with the signal condition at the anode thereof.

The output of the matrix tubes is impressed channel by channel over a plurality of conductors to suitable utilization apparatus which may be electronic applique units controlling the selecting magnets of a plural magnet printer or may be to the proper components of a multiplex to start-stop code converter. Further, it is also possible that such signal connections may be utilized for operating the magnets of a reperforator, by means of electronic applique units.

An operating pulse is originated upon the switching of the channel distributor and is fed back to the utilization apparatus of the preceding channel, in order that printing may occur in a plural magnet printer, a converter may operate to transmit the stored signal or the tape may be stepped in a reperforator.

Provision is also made in the receiving apparatus for the reception of Morse signals in such a manner that they may be understood and decoded. During the reception of such Morse signals, means are provided to prevent signal conditions from occurring in the matrix tubes.

The described receiving multiplex distributor has been described in terms of the reception of five or six unit code from two, three, or four transmitting channels. However, from the above description it becomes apparent that the number of impulses and/or channels may be altered readily by merely adding elements and following the theory of operation of the apparatus. Likewise, other modifications and additions may be readily made to the described electronic multiplex receiving distributor.

*Synchronization circuit*

In order that the receiving distributor may operate in complete synchronism with the transmitting distributor for a proper reception of signal impulses it is necessary that a synchronization or corrector circuit of some type be utilized with the apparatus. It is true that by utilizing frequency dividers at both stations having similar control crystals it is possible to remain very close to synchronism. However, with high precision crystals including temperature control thereof, there will always be some drift of frequency of one crystal with respect to the other, which is manifested by a phase shift of the receiving distributor with respect to received signals. It is the purpose of the corrector circuit to detect phase shifts due to oscillator drift appearing on the signaling channel and to increase or decrease the frequency of the crystal oscillator until equilibrium or exact phase relationship is restored. Accordingly, to provide such synchronization, circuits have been designed which will now be described.

It is to be remembered that during the prior description it was mentioned that the output of the frequency divider 1203 was amplified by means of the left-hand portion of the tube 1404, the output signal being impressed on a conductor 1406 in the anode circuit and to a junction point 1407. The amplifier wave will be further impressed from the junction point 1407 over a conductor 1431 to the normally negatively biased grid of the left-hand portion of a squaring tube 1432. The anode circuit of the left-hand portion of the squaring tube 1432 is connected over a conductor 1433 to a junction point 1434 and thence to the normally negatively biased grid of the right-hand portion of the tube 1432. The two portions of the tube 1432 will thus operate in opposite relationship to each other under the control of the wave introduced from the left-hand portion of the amplifier 1404 one side conducting while the opposite side is not conducting and vice versa. The tube 1432 is provided with a selection network 1451, similar to the selection network 1408.

The anode circuit of the left-hand portion of the tube 1432 is also connected over the conductor 1433 to the junction point 1434 and then by means of a conductor 1436 to a contact rotor 1437 of a manually operable selector switch indicated generally by the numeral 1438. If it is assumed that the switch 1438 is in position for four channel reception the circuit may be further traced from the rotor 1437, over a conductor 1439, to the normally negatively biased grid of the right-hand portion of a twin triode corrector gate vacuum tube 1421. The switch 1438 may form a gang switch with the switch 1402, both being operated together.

The anode circuit of the right-hand portion of the squaring amplifier 1432 is connected by means of a conductor 1442 to a spring clip associated with a contact rotor 1443 of the selector switch 1438. Assuming the switch 1438 to be in four channel position the circuit will be completed from the rotor 1443 over a conductor 1444 to the normally negatively biased grid of the right-hand portion of a twin triode corrector gate vacuum tube 1145.

The potential which will result in the anode circuits of the two portions of the squaring amplifier 1432 and which is impressed on the conductors 1436 and 1442 to the grids of the right-hand portions of the corrector gate tubes 1421 and 1446 will be square wave in form and will be 180° out of phase with respect to each other. Corrector gate tubes 1421 and 1446 operate so that the right-hand sections provide blocking potentials when conducting, to the respective left-hand portions of the gate tubes. When the right-hand sections are not conducting the left-hand sections operate as a normal self-biased amplifier.

It might be noted with respect to the two portions of the tube 1432 that their cathodes are connected together and through a resistor to ground, and that therefore when one portion of the tube is conducting blocking potential will be applied to the opposite portion thereof tending to retain that portion in a nonconducting condition.

It also will be remembered that the incoming signals were received on a conductor 1501 and passed through a magnetic diode 1503 and amplifying tubes 1507 and 1509 to a keyer 1511. The left-hand portion of the tube 1507 was connected by a conductor 1508 to the grid of the left-hand portion of the tube 1509. Intermediate the anode and grid connections in the conductor 1508 a branching conductor 1514 connects through a condenser to the normally negatively biased grid of the left-hand portion of a twin triode pulse generator vacuum tube 1516.

The right-hand portion of the amplifier 1507 was described as having a conductor 1510 connected to the anode circuit thereof to which is connected a conductor 1517 which extends through a condenser to the normally negatively biased grid of the right-hand portion of the pulse generator 1516.

Because of the above mentioned connections each time that a signal transition from mark to space or space to mark occurs a positive pulse will be delivered to one grid at the instant a negative pulse is delivered to the opposite grid of the tube 1516. On the next reversal the grid excitation polarity will be reversed. Since both grids of the tube 1516 are biased negatively beyond the cut-off condition, only positive pulses are effective. Therefore, at the time of a space to mark reversal, the right-hand portion of the tube 1516 will conduct, and during a mark to space reversal of the line signal the left-hand portion of the tube will conduct, the effect of which will be to rapidly discharge the condenser 1519, and sharp negative pulses will appear on the conductor 1518. The conductor 1518 is also connected to the normally positively biased grid of the left-hand portion of a single operation or one-shot multivibrator indicated generally by the numeral 1301. As is well known with respect to single operation multivibrators, upon a negative impulse being impressed on the grid of the normally conducting portion thereof, that portion will be rendered nonconducting and its opposing portion will be rendered conducting for a period necessary for a negative charge to be dissipated from a coupling condenser. Thereafter, the multivibrator will return to its normal condition with the normally conducting portion once again conducting and the opposed portion nonconducting. As the impulses impressed on the conductor 1518 will occur for every signal transition the multivibrator 1301 will be producing a plurality of positive square-topped impulses in its output circuit which is indicated as the conductor 1302. The positive impulses on the conductor 1302 will be coupled through a condenser 1303 to a potentiometer to the normally negatively biased grid of the left-hand portion of the "fast" gate tube 1421 and over a branching conductor 1447 to the normally negatively biased grid of the left-hand portion of the "slow" gate tube 1446.

As was mentioned above the cathodes of the right and left-hand portions of the tubes 1446 and 1421 are connected together so that if positive potential is applied to the grid of either of the right-hand portions of the two tubes that portion of the tube will be rendered conducting and the opposing portion thereof will be blocked due to positive potential on its cathode. As the signals impressed on the grids of the right-hand portions of the two tubes 1446 and 1421 are 180° out of phase with respect to each other, the two portions will be conducting alternately, one portion not conducting while the other portion is conducting. If positive potential is applied to the grids of the left-hand portions of the tubes 1446 and 1421 during the interval that the right-hand portion is conducting, the left-hand portion will not be rendered conducting. However, if such potential is applied at a time when the right-hand portion is not conducting, the left-hand portion will be rendered conducting.

If it be assumed that the left-hand portion of the tube 1446 has been rendered conducting, its anode potential will decrease with a similar decrease in a conductor 1448 connected in the anode circuit. The conductor 1448 is connected through a condenser to the normally positively biased grid of a normally conducting vacuum triode 1304. The negative pulse on the grid of the tube 1304 will cause the tube to be rendered nonconducting resulting in an increase in anode circuit potential. A corresponding increase in potential will be applied to a conductor 1306 which is connected in the anode circuit and through a condenser 1307 to the anode of the left-hand portion of a twin diode 1308. As the anode of the left-hand portion of the diode 1308 is connected to a source of negative battery over a conductor 1309 the positive potential from the conductor 1306 to the anode must be higher in value than the negative potential supplied over the conductor 1309 before the left-hand portion of the diode 1308 will conduct. The tube 1304 is simply a phase converter.

If instead it be assumed that the left-hand portion of the tube 1421 has been rendered conducting, such will result in a drop in anode potential. A similar potential drop will exist on a conductor 1449 connected in the anode circuit and also connected through a condenser 1311 to the cathode of the right-hand portion of the twin diode 1308. The cathode of this portion is also connected over a conductor 1312 to a source of positive threshold battery. Under such conditions the negative pulse through the condenser 1311 to the cathode must be greater in value than the positive battery supplied over the conductor 1312 before the right-hand portion of the diode 1308 will conduct.

The positive output of the left-hand portion of the diode 1308 is fed by means of a conductor 1313 to a one stage condenser resistor filter indicated generally by the numeral 1314. The negative output from the right-hand portion of the diode 1308 appears on the anode circuit and is impressed over a conductor 1316 to a junction point 1317 with the conductor 1313 leading to the filter 1314. The filter 1314 will operate to take an average of the positive and negative potentials applied thereto, the output of the filter being either negative or positive direct current depending upon which polarity of energy predominates. Also, such output may be zero if the values of positive and negative potential energy are equal.

The output of the filter 1314 is fed over a conductor 1318 to the normally negatively biased control grid of a reactance tube 1319. The reactance tube 1319 is in a conventional type of quadrature circuit utilized for automatic frequency control and therefore it is not believed necessary to describe its operation in detail, such being well known in the art.

The bias voltage on the grid of the tube 1319 is so adjusted by means of a potentiometer 1321 that a zero-center corrector meter 1323 is at rest at the zero or center position of the scale, said setting being in the absence of any correction energy being received from the corrector, or simply a no-signal condition. This position of the corrector meter 1323 indicates the approximate center of the frequency-control characteristic of the reactance tube 1319, so that upon being biased in a more negative direction, the tube's apparent capacitive reactance increases, and if biased less negative or in the positive direction, the effective capacitive reactance decreases. The reactance tube 1319 therefor operates as a variable capacitive load upon the crystal oscillator grid circuit in shunt with the frequency-adjusting trimmer condenser 1208, for limited range frequency variation, with direct current bias control supplied by the described corrector system.

The normal adjustment procedure is to set the frequency of the oscillator by means of the trimmer condenser 1208, with the reactance tube biased in the center of its control characteristic, so that the frequency is identical with that at the transmitting station. Any minor deviations in frequency due to crystal ageing or other causes will then be corrected for by resultant shift in the reactance tube bias, the direction and amount of drift, fast or slow, being indicated directly by the meter reading, which then may be corrected for manually with the trimmer condenser 1208, causing the meter 1323 to be reset to zero.

With the line signals out of phase with the local receiving distributor, such as the condition which exists when the system is first placed in operation, assume that line signal reversals occur at a time so that only the "fast" gate tube 1421 is operating. The "slow" gate tube 1446 has zero output at this time, for reasons described previously. The output of the gate tube 1421 is impressed over a conductor and through a condenser 1311 to the right-hand portion of an output gate diode 1308, and thence over a conductor 1316 to a junction point 1317 and over conductor 1313 to a filter network 1314, the resulting negative potential adding to the fixed bias potential on the conductor 1318 to bias the reactance tube 1319 to cut-off, and to increase to a maximum the frequency change in the crystal oscillator over a conductor 1322, which is reflected in a proportionate increase in the distributor drive pulse frequency, and in corrected squaring tube 1432 frequency.

The phase of the square wave input to the right-hand portions of the gate tubes 1421 and 1446 with respect to the input to the left-hand portions thereof continues to shift until a position is reached where the "slow" gate tube 1446 begins to conduct and reduces potential on a conductor 1448 and through a condenser to the grid of an invertor tube 1304. Such reduced potential results in the invertor tube 1304 being rendered nonconducting, with energy being delivered over a conductor 1306 and through a condenser 1307 to the positive half of the diode 1308. Continued operation of the crystal oscillator at this higher frequency advances the phase until more and more energy is delivered to the positive output of the output diode 1308. At this time the filter 1314 is integrating the outputs of the diode on the conductor 1313 and modifying the grid bias to the reactance tube 1319 until a point of equilibrium is reached, and the oscillator frequency has been restored to its original absolute value and the system is in correct phase relationship as regards to the relative position of any given signal impulse and the receiving distributor. Any slight deviations of frequency in either transmitting or receiving oscillators will be readily detected by the corrector system and the compensation introduced by the reactance tube 1319.

A more detailed description of the operation of the corrector circuit may be had by reference to copending application Serial No. 54,773 filed on October 15, 1948, in the name of T. A. Hansen.

*Phasing controls*

During the operation of multiplex systems and particularly at the initiation of operation thereof, it is necessary that means be provided whereby the receiving apparatus may be phased with respect to the incoming signals. Accordingly, such means have been provided in the present apparatus for such phasing purposes and will now be described.

It should be remembered that during the previous description of the receiving distributor apparatus it was mentioned that negative drive pulses were impressed on a conductor 1427 and through a condenser 1701 to the normally positively biased grid of the left-hand portion of a normally conducting tube 1702. The result of such pulses were that the left-hand portion of the tube 1702 would be rendered non-conducting resulting in positive potential being impressed over a conductor 1704 and through a condenser 1706 for causing the right-hand portion of the tube 1702 to be rendered conducting. Upon the right-hand portion of the tube 1702 being rendered conducting, positive potential will be applied to the common conductor 1707 which through branching conductors such as 1708 having condensers therein such as 1709, are connected to the control grids of all of the impulse distributor tubes 1711, 1712, 1801, 1802, 1803, and 1901. It was described that with such potential on the common conductor 1707 the electronic distributor would step to a succeeding tube, it being assumed that the control grid of such succeeding tube also received a conditioning potential from the output of its preceding tube.

In the event that the phasing of the incoming line signals and operation of the receiving distributor is not correct and it is necessary only that the impulse distributor be stepped in order to regain phasing, such may be done by the closure of a manually operable switch 1728. The result of the closure of such switch 1728 is to introduce a negative pulse over a conductor 1729 and through an appropriate condenser to the grid of the left-hand portion of the tube 1702. This negative potential will cause the left-hand portion of the tube 1702 to be extinguished resulting, as described previously, in the right-hand portion of such tube being rendered conducting and causing through its output circuit the stepping of the impulse distributor. Therefore, it may be seen that by closure of the switch 1728, which may be through the operation of a push button, that the distributor may be stepped one impulse position for each closure thereof, in addition to and irrespective of the receipt of negative drive pulses.

In the event that the incoming line signals and the operation of the receiving distributor are out of phase one or more channels, provision is made through the use of a manually operable switch 2253 for remedying such difficulty.

During the description of the channel distributor it should be remembered that it was mentioned that at such time as the impulse distributor completed a cycle a positive impulse would be directed over a conductor 1812 to cause the right-hand portion of the tube 2202 to be rendered conducting. The description further set forth how such caused the left-hand portion of the tube 2202 to be rendered nonconducting, which after sufficient time delay and upon the left-hand portion of the tube 2202 once again automatically becoming conducting, the left-hand portion of a tube 2208 would be rendered nonconducting. Upon the left-hand portion of the tube 2208 becoming nonconducting, the right-hand portion thereof would be rendered conducting, resulting in positive potential being applied in its output circuit for causing the channel distributor to step one channel, that is, cause a succeeding channel distributor tube to be rendered conducting.

At such time, however, as the switch 2253 is closed negative bias will be directed through the switch and over an obvious circuit to the grid of the left-hand portion of the tube 2208 causing it to be rendered nonconducting. The right-hand portion of this tube will thus be rendered conducting causing positive potential for stepping the channel distributor one channel. It may, therefore, be seen that each time that the switch 2253 is closed the channel distributor will be stepped one channel.

From the above description it may be understood that through the stepping of the impulse distributor one impulse position for each closure of the switch 1728 and through the stepping of the channel distributor one channel for each closure of the switch 2253 correct phasing may be made simply and quickly irrespective of the relative out of phase positions of the received line signals and the operation of the receiving distributor.

*Circuit continuity system*

During the description of the transmitting apparatus mention was made of certain components which were utilized in conjunction with a circuit continuity system. However, a description of the components only was given as in most instances it was not possible to describe how they operated in the system prior to a description of the components utilized in the portion at the receiving station.

During the description of the transmitting apparatus it was mentioned that the Number 6 matrix tube 524 for the A channel under normal operating conditions had its grid conditioned by the circuit continuity equipment and therefore would conduct during its impulse interval of transmission. Through the various components at the transmitting and receiving stations, such signal will be received as a positive condition on the anode of the No. 6 A channel impulse matrix tube 1927. Under such condition and during the regular period of selection of the A channel sixth impulse matrix tube 1927, the same will be allowed to conduct thereby producing positive potential in its output cathode circuit and over a conductor 1929 and through a condenser 1628 to the diodes of a detector tube 1629. The tube 1629 is similar to that of a conventional AVC circuit and it is only believed necessary to state with respect to such a circuit that with signal energy on the diodes the grid will be biased negatively, with respect to the cathode. Under such conditions the tube 1629 will not conduct and therefore will preclude the completion of a circuit which might otherwise be traced from a source of positive battery, over a conductor 1631, through the winding of a relay 1632, over a conductor 1633, and through the tube 1629 to ground. Therefore, under this condition the relay 1632 will be de-energized. This is the normal operating condition of the apparatus and signifies that a continuous circuit connection is made.

Under the above described conditions an armature 1634 of the relay 1632 will be in its unattracted position completing an obvious circuit for the illumination of a signal light indicatng that the relay is de-energized.

Also under this condition an unattracted armature 1636 of the now de-energized relay 1632 will complete a circuit from a source of negative battery over a conductor 1637, through the armature 1636 and over a conductor 1638 which is connected to the circuit continuity system at a transmitting unit local to the receiving unit being described. The utilty of such connecton and the supply of negative battery thereto will be described hereinafter.

If it now be assumed that the transmission path has failed or the break key 1013 has been operated as will be signified by an absence of impulses at the left-hand portion of the A channel matrix tube 1927, no potential will be impressed over conductor 1929 to the diodes of the detector tube 1629. Under this condition the triode section of tube 1629, as is well known in the art, will be allowed to conduct since its grid bias has been removed. Conduction of the tube 1629 results in the completion of the circuit for the energization of the relay 1632, previously described as being de-energized.

Upon the relay 1632 energizing, it will attract its armatures 1634 and 1636 thereto. The attraction of the armature 1634 completes a circuit for the illumination of a signal light to indicate that the relay is energized.

The attraction of the armature 1636 completes a circuit from a source of negative battery over the conductor 1637, through the armature 1636, over a conductor 1639 with which it is in engagement, through the movable swinger 1618 of the switch 1604, assuming the switch to be in its illustrated position, and thence over conductor 1619 to the normally positively biased grid of the left-hand portion of the triode 1623. The tube 1623 will be rendered nonconducting at this time thereby resulting in its no longer applying blocking potential to the cathode of the right-hand portion of the tube 1623, as has been described previously, causing that portion to conduct. When the right-hand portion of the tube 1623 is conducting current will be supplied to energize the primary of the transformer 1626 which has the loudspeaker 1627 in the secondary thereof. Thus, under an abnormal operation of the apparatus the loudspeaker 1627 will be operated to advise an attendant of such fact.

If it now be assumed that the receiver disclosed and described is local to the transmitter disclosed and described it may be understood that during the interval that the system is operating correctly, at which time the relay 1632 is described as being de-energized with the resultant nonattraction of its armature 1636 and the supplying of negative battery over the conductors 1637 and 1638 to the transmitter, such negative potential will be impressed on the conductor 922 and to the grid of the right-hand portion of the tube 914. Under this condition, as described with respect to the transmitter, the right-hand portion of the tube 914 will be unable to conduct and therefore no circuit will be completed over the conductor 1009 for the energization of the relay 1008. This, it is to be remembered has been described as the normal condition of the transmitting apparatus signifying that the system is operating normally.

If, to the contrary, it be assumed that the system is for some reason working improperly, at which time the relay 1632 will be energized with the armature 1636 attracted, no potential at all will be applied over the conductor 1638 to the conductor 922 connected to the grid of the right-hand portion of the tube 914. Under this condition the grid of such tube will be at ground potential over an obvious circuit and the tube will be allowed to conduct, resulting in the completion of the circuit over the conductor 1009 for the energization of the relay 1008. Under this condition and as has been described with respect to the transmitting apparatus, the armature 1011 will be attracted and will complete a circuit for supplying ground at 1014 to the junction point 1919 and thence over the conductor 534 to the grid of the No. 6 A channel matrix tube signified by the left-hand portion of the tube 524. Thus, as the transmitting unit operates a no signal condition will occur on the No. 6 impulse A channel matrix tube. As has been described, when this left-hand portion of the tube 1927 fails to conduct the detector tube 1629 will conduct causing energization of the relay 1632 and operation of the loudspeaker 1627 to signify that the continuity channel has been de-energized.

During the description of the transmitting apparatus mention was made that an attendant at that station could summon an attendant at the receiving station by placing switch 1013 in its "break" position. This has the effect of preventing operation of the matrix tubes, and thus operating the loudspeaker 1627, as described above.

Thus it may be seen from the above description that the A channel sixth impulse transmitted from a transmitting station to a remotely located receiving station will cause the receiving apparatus to recognize it and in turn control its local transmitter to transmit the sixth pulse back to a receiver located at the station where the original transmission was initiated. In this manner the circuit continuity system may be considered to be a complete circuit, extending from a transmitting station to a distant receiving station, from the distant receiving station to its local transmitting station, back to the receiving apparatus located at the original transmission station and thence from the receiving apparatus to the original transmitting apparatus.

While a specific embodiment of the invention has been illustrated and described, it is obvious that modifications and additions may be made thereto without departing from the spirit and scope of the invention.

What is claimed is:

1. In a multiplex telegraph transmitter, a plurality of sources of signals, each source comprising signals from a different communication channel, a plurality of groups of matrix tubes, one group connected to each of said sources of signals and conditioned thereby, an electron tube channel distributor for further conditioning each of said groups of matrix tubes in succession, an electron tube impulse distributor for successively causing the operation of conditioned ones of said matrix tubes in each group of said matrix tubes for controlling signal transmission on a single channel from all said different sources, a source at a time, and means for driving said channel distributor by said impulse distributor, whereby after said impulse distributor has operated conditioned matrix tubes in one of said groups said channel distributor will further condition the matrix tubes of a succeeding group.

2. In a telegraph receiver, means for receiving on a single channel multiplex signals composed of signals from a plurality of communication channels, a plurality of groups of matrix tubes conditioned by said signal receiving means, an electron tube distributor for conditioning each of said groups of matrix tubes successively, an electronic distributor for operating conditioned ones of said matrix tubes in each group, means controlled by said last-mentioned distributor for controlling the operation of said first-mentioned distributor, and means for separating and utilizing the received signals under the control of each of said groups of matrix tubes, whereby signals of individual channels will be separated.

3. In a telegraph receiver, means for receiving on a single channel multiplex signals composed of signals from a plurality of communication channels, an electronic impulse distributor of the ring type comprising a plurality of tubes, means to cause said tubes to be operated successively, an electronic channel distributor of the ring type comprising a plurality of tubes operating successively, means to cause a predetermined one of said impulse distributor tubes to control the operation of said channel distributor, a plurality of groups of matrix tubes jointly conditioned by said signal receiving means and said channel distributor and operated by said impulse distributor, said groups of matrix tubes being controlled in such a manner that signals of individual channels will be received by each group of tubes independently and successively, and signal utilization means under the control of said group of matrix tubes, whereby signals of individual channels will be separated.

4. In a multiplex telegraph receiver, multiplex signal receiving means, said multiplex signals being composed of signals received on a single channel from a plurality of communication channels, a plurality of groups of matrix tubes, said groups of matrix tubes being equal in number to the number of channels, all of said tubes being connected to said signal receiving means and conditioned thereby, an electron tube channel distributor for conditioning each of said groups of matrix tubes in succession, an electron tube impulse distributor for successively causing the operation of conditioned ones of said matrix tubes in each group of said matrix tubes, means for operating said channel distributor by said impulse distributor, whereby after said impulse distributor has operated conditioned matrix tubes in one of said groups said channel distributor will further condition the matrix tubes of a succeeding group, and signal utilization means connected to each of said groups of matrix tubes and under the control thereof, whereby signals of individual channels will be separated.

5. In telegraph receiving apparatus, means for receiving on a single channel multiplex signals composed of signals from a plurality of communication channels, a plurality of groups of matrix tubes conditioned by said signal receiving means, an electronic channel distributor of the ring type formed of a plurality of tubes, each of said tubes conditioning a group of said matrix tubes, an electron tube impulse distributor of the ring type for operating conditioned ones of said matrix tubes in a group successively, means controlled by said impulse distributor for causing the operating of said channel distributor to cause said channel distributor tubes to be rendered conducting successively, signal utilization means connected to each of said groups of matrix tubes and controlled thereby, whereby signals of different communication channels will be separated, and means controlled by the rendering conducting of one of said channel distributor tubes to perform control functions in said signal utilization means connected to said group of matrix tubes conditioned by the preceding one of said channel distributor tubes.

6. In a telegraph transmitter, a plurality of sources of signals, each source comprising signals from a different communication channel and composed of equal time intervals, an electronic channel distributor comprising a series of tubes operating in timed succession, a tube associated with each of said channel distributor tubes whereby when one of said channel distributor tubes is operating its associated tube will be blocked from operation and vice versa, an electronic impulse distributor comprising a series of tubes operating in timed succession, means to control the operation of said channel distributor by said impulse distributor, a plurality of matrix tubes jointly conditioned by said plurality of sources of signals and said tubes associated with said channel distributor tubes and operated by said impulse distributor tubes, a signaling channel, and means controlled by said matrix tubes for impressing signals on said signaling channel from all said different sources.

7. In a telegraph transmitter, a plurality of sources of signals, each source comprising signals from a different communication channel and composed of a predetermined number of equal time intervals, an electronic channel distributor comprising a plurality of tubes equal in number to the sources of signals operating in timed succession, an electronic impulse distributor comprising a plurality of tubes equal in number to the time intervals of a signal operating in timed succession, means to control the operation of said channel distributor by said impulse distributor, a plurality of groups of matrix tubes, said groups being equal in number to the number of signal sources and the number of tubes in each group being equal to the number of time intervals of a signal, each group of said matrix tubes being conditioned under the joint control of signals from a different one of said sources and a different one of said tubes of said channel distributor and operated by all of the tubes of said impulse distributor, a signaling channel, and means controlled by said matrix tubes for impressing signals from all of said different sources on said signaling channel.

8. In a telegraph transmitter, telegraph signal initiating means, an electronic channel distributor comprising a plurality of tubes operating in timed succession, an electronic impulse distributor comprising a plurality of tubes operating in timed succession, means to control the operation of said channel distributor by said impulse distributor, a plurality of matrix tubes, each tube having at least an anode, a cathode and a grid, means under the control of said channel distributor tubes to supply conditioning potential to the anodes of said matrix tubes, means under the control of said signal initiating means to supply conditioning potential to the grids of said matrix tubes, means under the control of said impulse distributor tubes to supply operating potential to the grids of said matrix tubes, a signaling channel, and means in the anode circuits of said matrix tubes for impressing telegraph signals on said signaling channel.

9. In a telegraph transmitter, a plurality of sources of signals, each source comprising signals from a different communication channel and composed of a predetermined number of equal time intervals, an electronic channel distributor comprising a plurality of tubes equal in number to the sources of signals operating in timed succession, an electronic impulse distributor comprising a plurality of tubes equal in number to the time intervals of a signal operating in timed succession, means to control the operation of said channel distributor by said impulse distributor, a plurality of groups of matrix tubes, said groups being equal in number to the number of signal sources and the number of tubes in each group being equal to the number of time intervals of a signal, said matrix tubes each having at least an anode, a grid and a cathode, each group of said matrix tubes receiving conditioning anode potential under the control of one of said channel distributor tubes, receiving grid conditioning potential or cathode blocking potential under the control of one of said sources of signals and receiving grid operating potential from all of said impulse distributor tubes, a common anode resistor in the anode circuits of each group of matrix tubes, a signaling circuit, and means controlled by said common anode resistors for impressing signals from all of said different channels on said signaling channel.

10. In a telegraph receiver, a source of single channel multiplex signals composed of signals of a plurality of communication channels, an electronic channel distributor comprising a plurality of tubes operating in timed succession, an electronic impulse distributor comprising a plurality of tubes operating in timed succession, means to control said channel distributor by said impulse distributor, a plurality of groups of matrix tubes, each group being assigned to one of said plurality of signal channels, said tubes each having an anode, grid and cathode, means controlled by said source of signals to supply conditioning potential to the anodes of all of said matrix tubes, means controlled by said channel distributor tubes to supply conditioning potential to the grids of said matrix tubes, one each of said distributor tubes supplying such potential to the tubes of one each of said groups of matrix tubes, means controlled by said impulse distributor tubes for supplying operating potential to the grids of said matrix tubes, and individual means controlled by the output cathode circuit of said matrix tubes in each of said groups of tubes, whereby signals of individual channels will be separated.

11. In telegraph apparatus operating with multiplex signals which are composed of signals of a plurality of different communication channels and with each signal having a plurality of equal time intervals, an electronic channel distributor comprising a plurality of tubes equal in number to the number of channels operating in timed succession, an electronic impulse distributor comprising a plurality of tubes equal in number to the number of time intervals of a signal operating in timed succession, means to control the operation of said channel distributor by said impulse distributor, a plurality of groups of matrix tubes, each group being assigned to one of the signal channels and being conditioned by one of said channel distributor tubes, and having a number of tubes equal in number to the equal time intervals of a signal and being operated by said impulse distributor tubes, means to control said matrix tubes by said distributors so that during the time that one of said channel distributor tubes conditions its assigned group of matrix tubes for a single communication channel all of said matrix tubes in that group will be operated by said impulse distributor tubes, and signal utilization means under the control of said matrix tubes.

THEODORE A. HANSEN.

REFERENCES CITED

The following references are of record in the file of this patent:

UNITED STATES PATENTS

| Number | Name | Date |
| --- | --- | --- |
| 1,765,474 | White | June 24, 1930 |
| 1,864,074 | Krum | June 21, 1932 |
| 2,231,442 | Finch | Feb. 11, 1941 |
| 2,247,909 | Doty | July 1, 1941 |
| 2,248,820 | Haselton | July 8, 1941 |
| 2,268,222 | Peterson | Dec. 30, 1941 |
| 2,300,007 | Richards | Oct. 27, 1942 |
| 2,302,535 | Durbin | Nov. 17, 1942 |
| 2,339,682 | Cox | Jan. 18, 1944 |
| 2,365,450 | Bliss | Dec. 19, 1944 |
| 2,384,792 | Brown | Sept. 18, 1945 |
| 2,421,606 | Fitch | June 3, 1947 |
| 2,425,307 | Desch | Aug. 12, 1947 |
| 2,447,799 | Dickinson | Aug. 24, 1948 |
| 2,447,800 | Dickinson | Aug. 24, 1948 |
| 2,451,859 | Mumma | Oct. 19, 1948 |
| 2,465,355 | Cook | Mar. 29, 1949 |